Fig. 9.

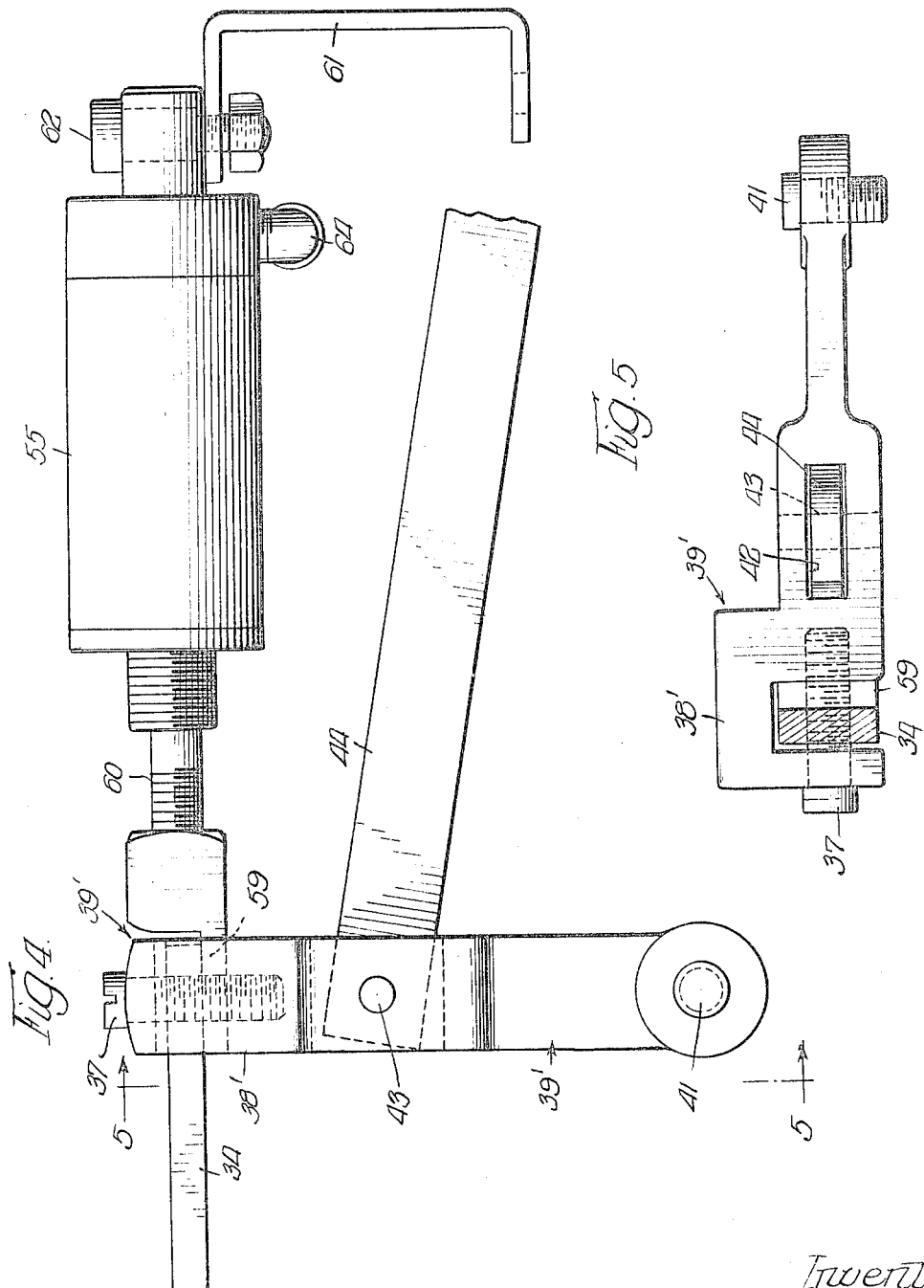

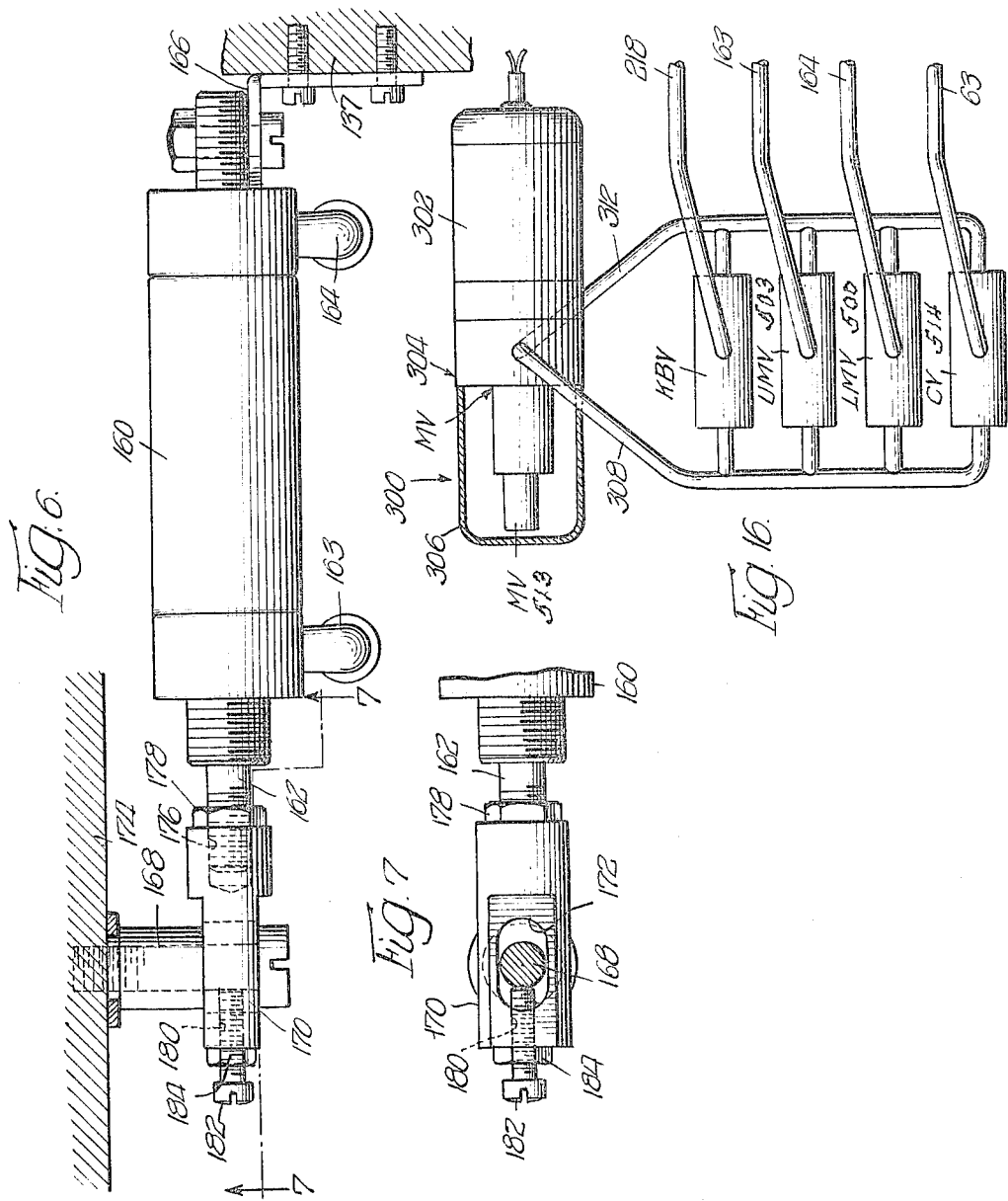

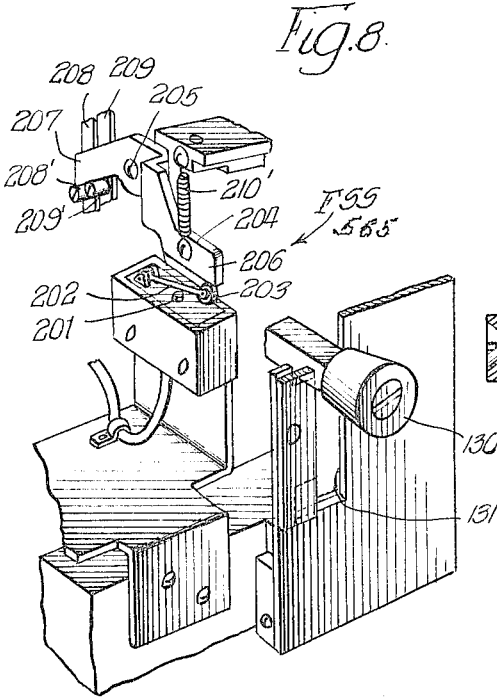
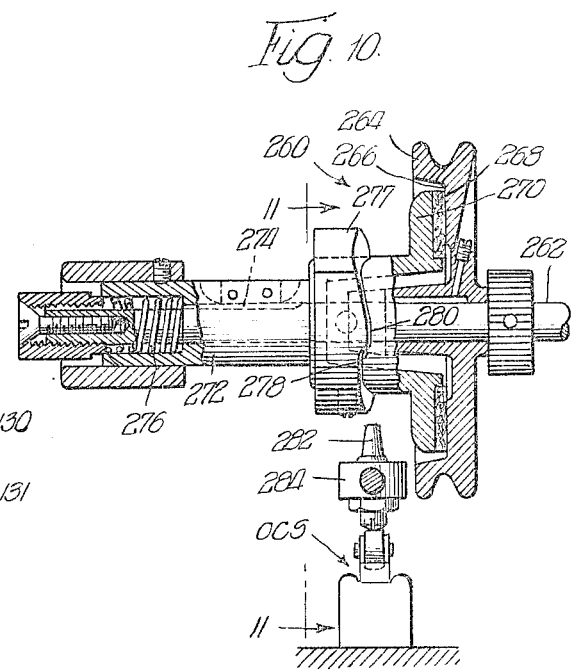
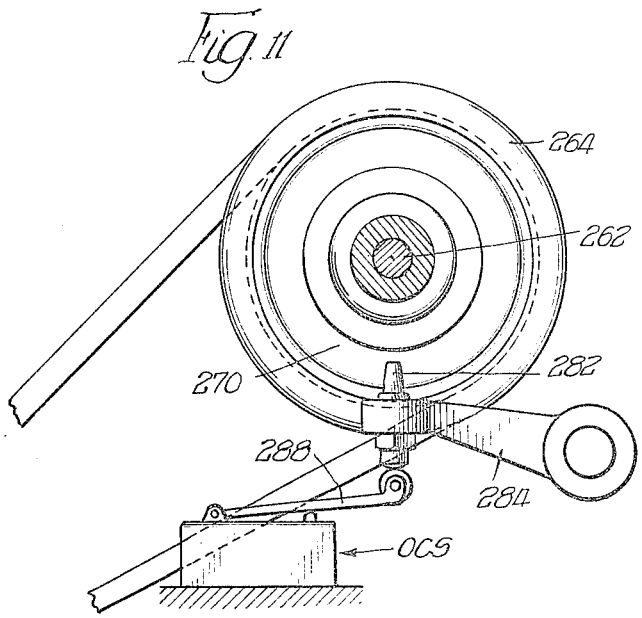

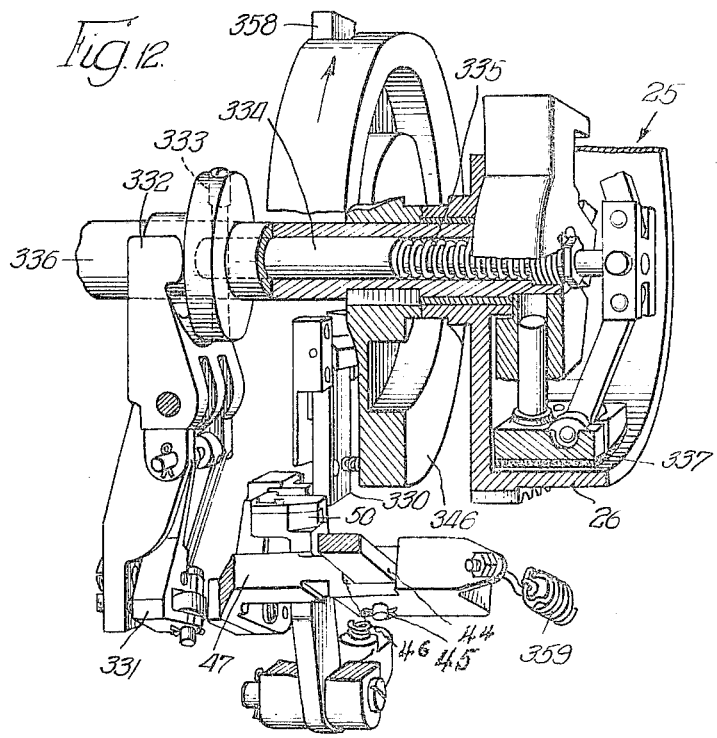
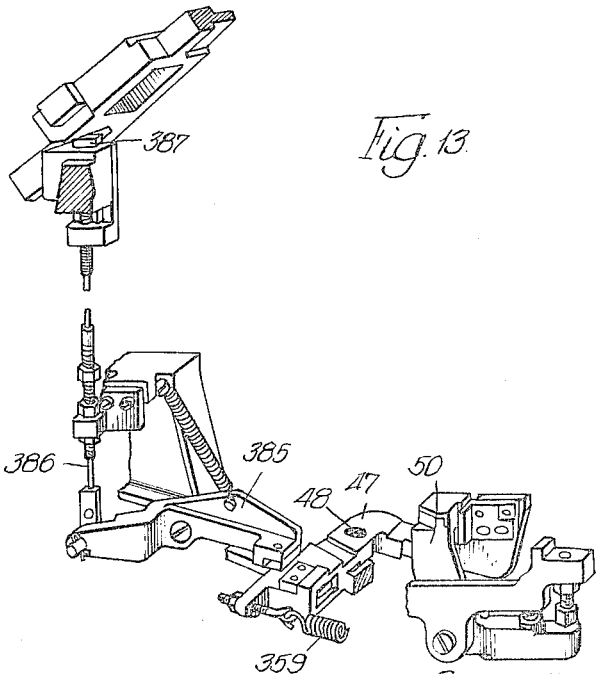

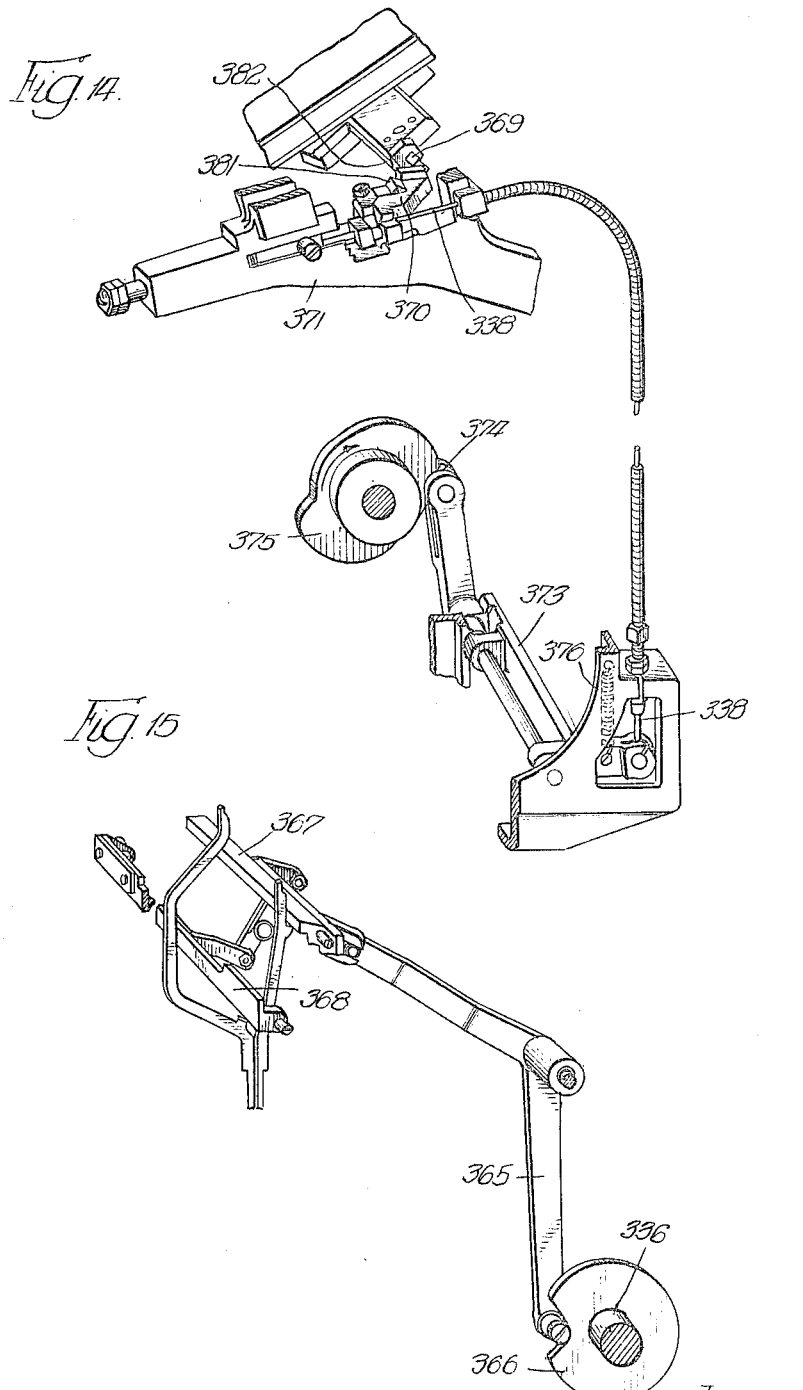

FIG 19

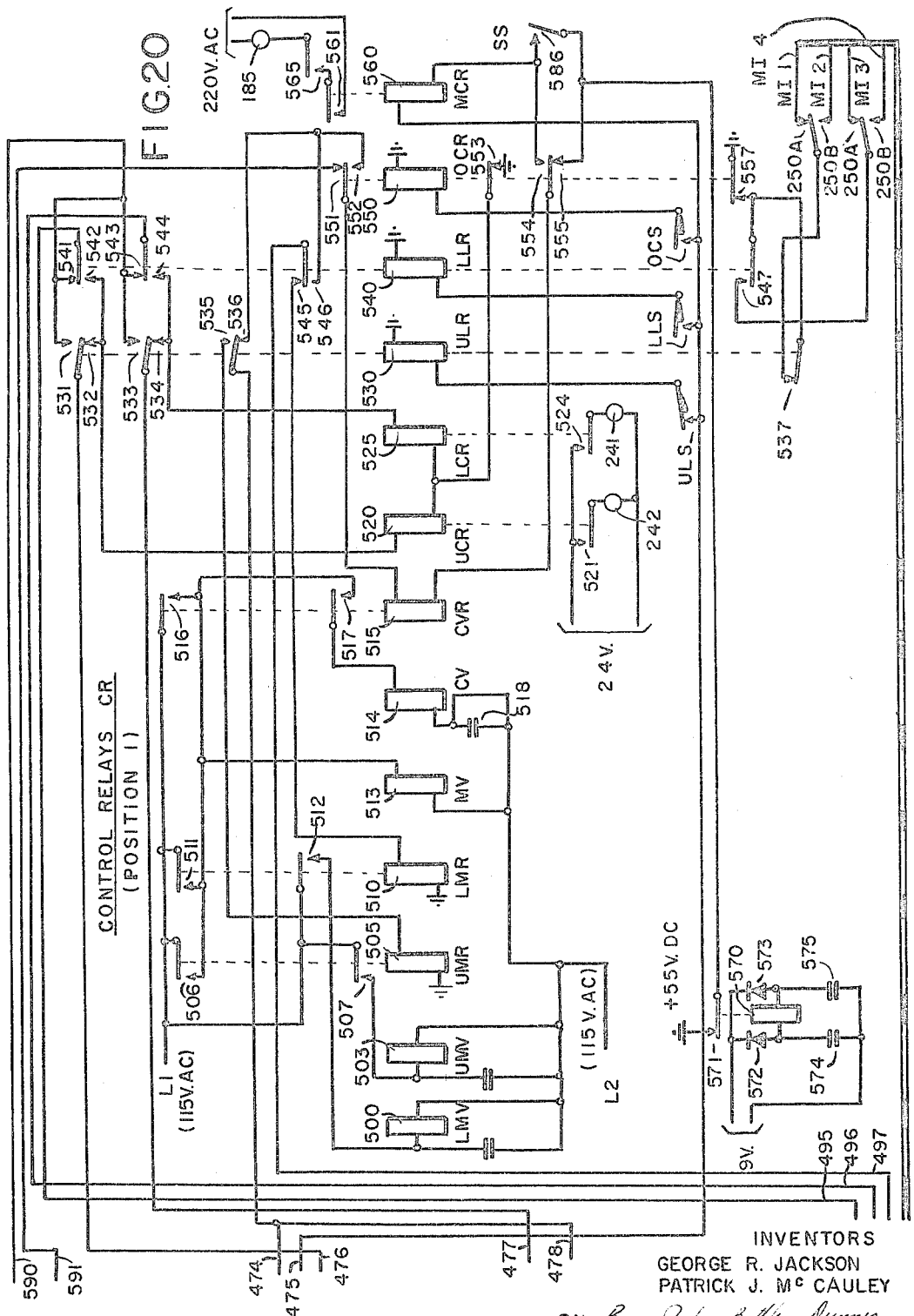

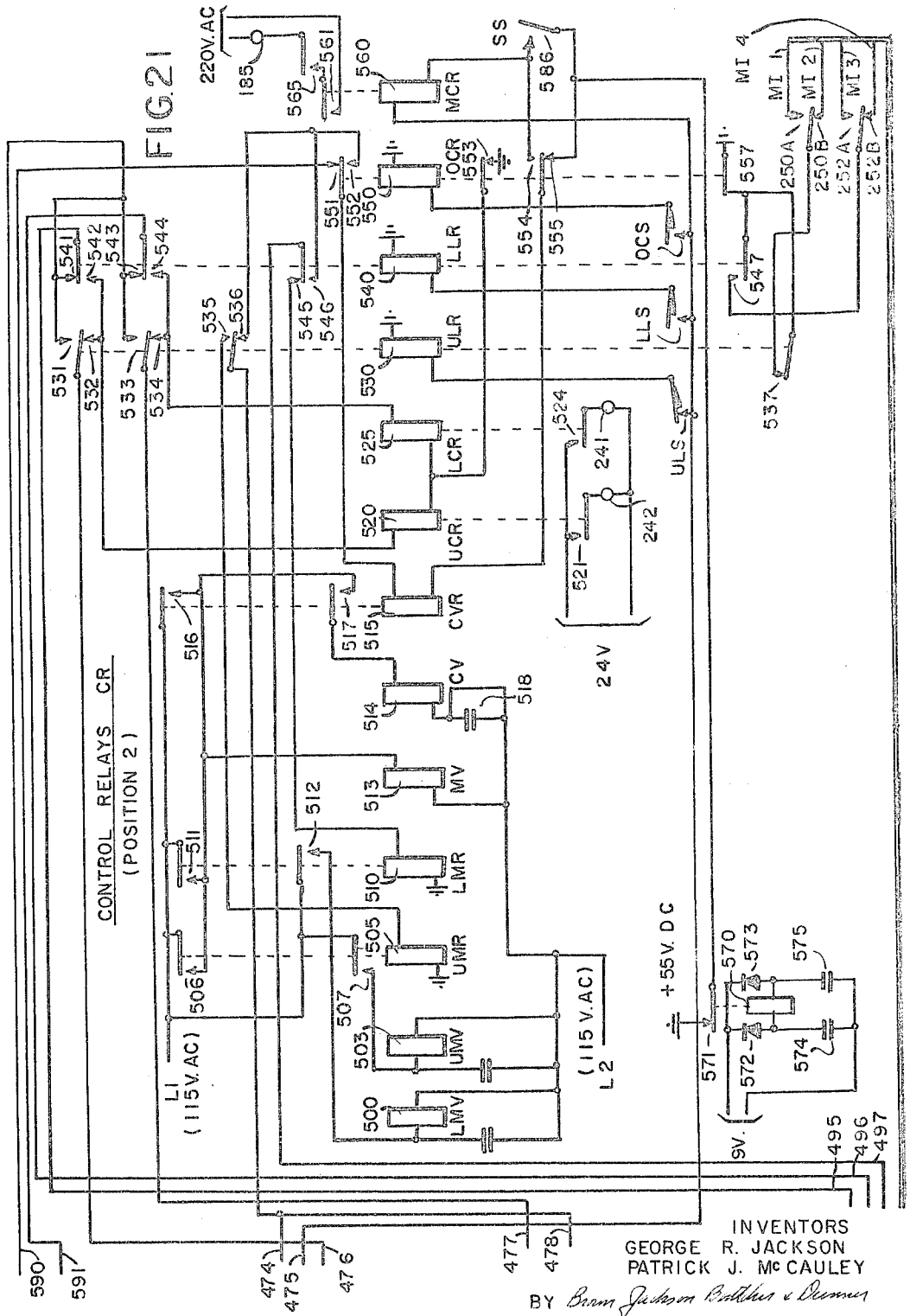

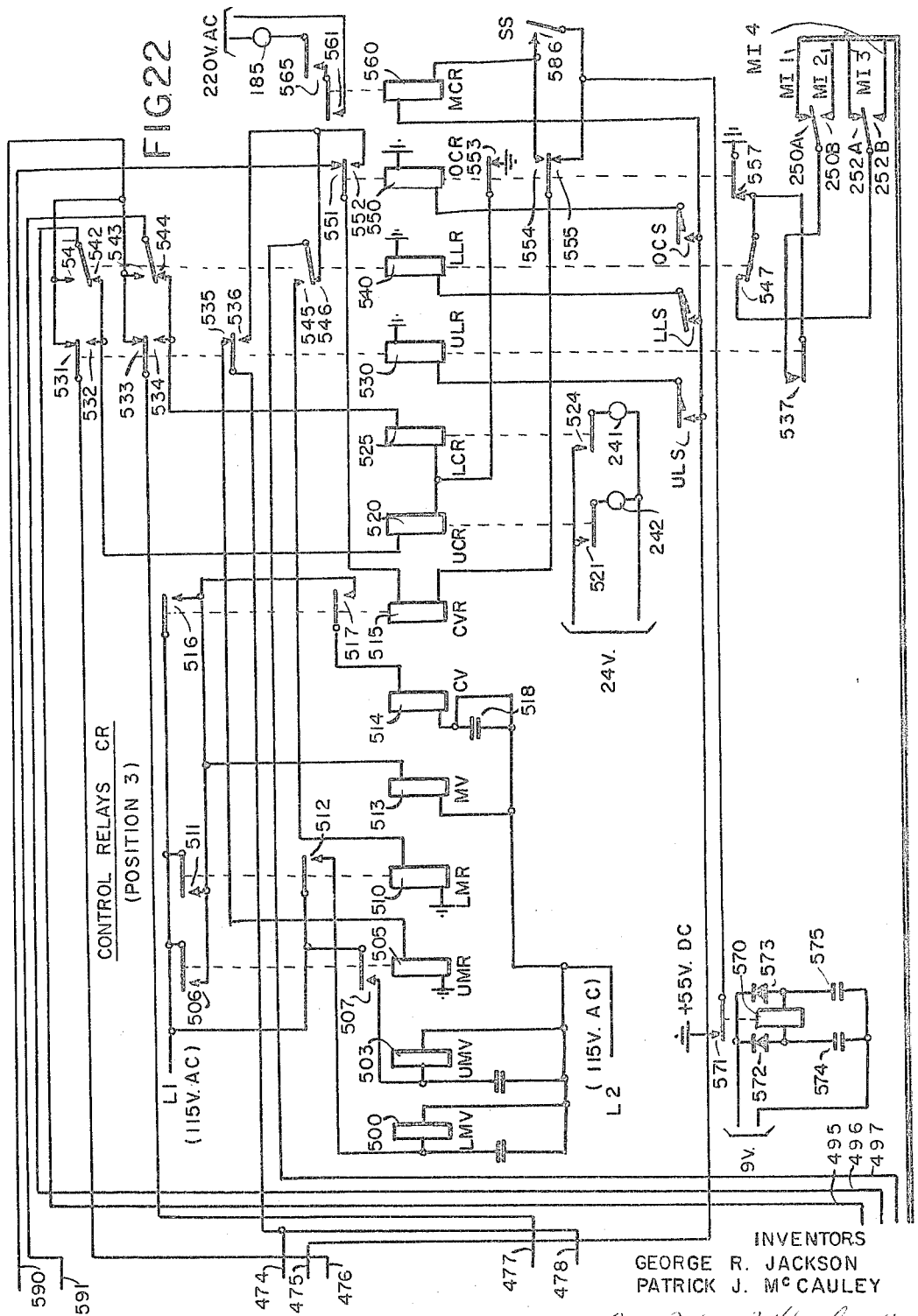

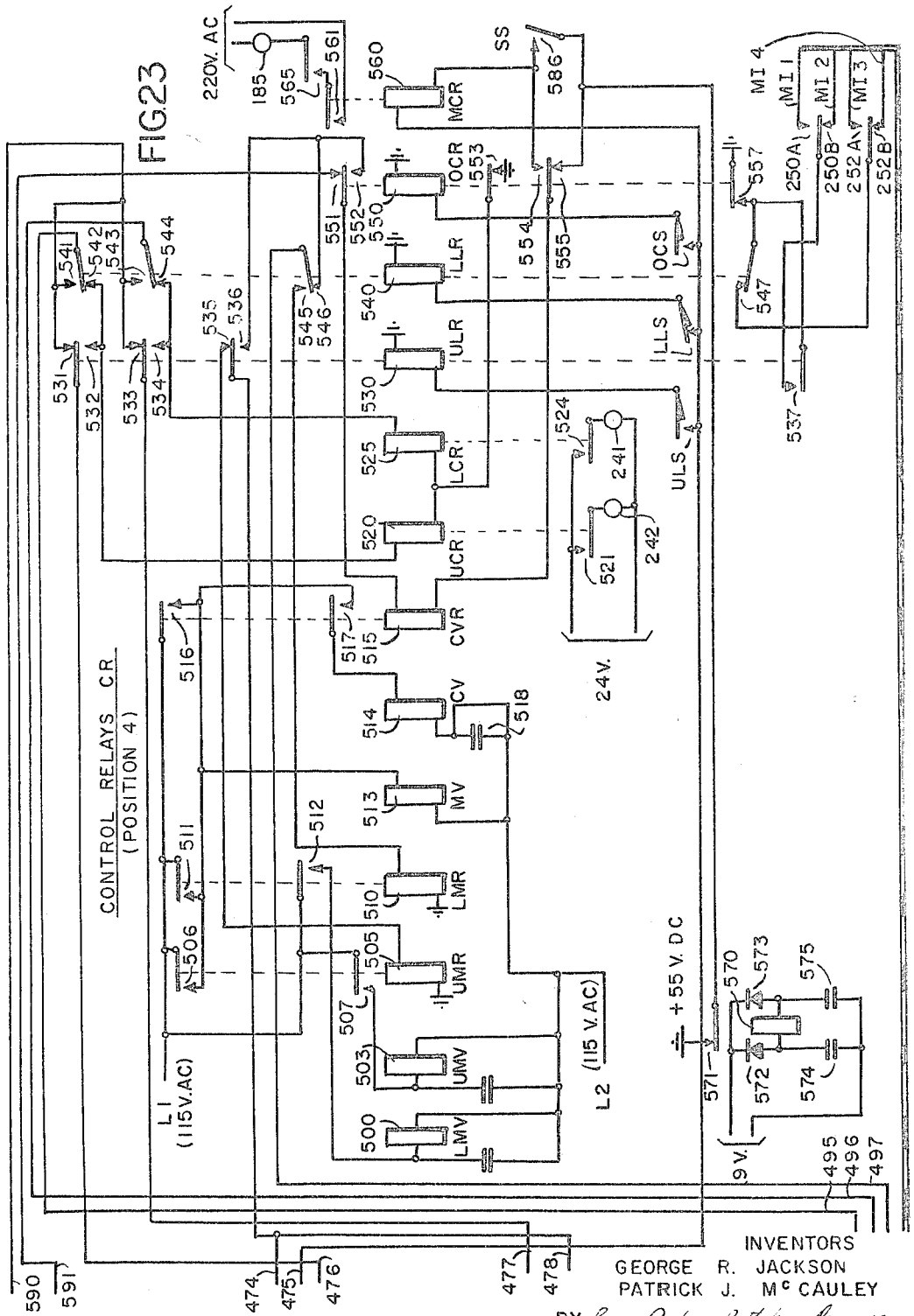

United States Patent Office 3,291,291
Patented Dec. 13, 1966

3,291,291
AUTOMATIC MAGAZINE CONTROL MECHANISM FOR LINECASTING MACHINES
George Robert Jackson and Patrick J. McCauley, Glenview, Ill., assignors to Mohr Lino-Saw Company, Skokie, Ill., a corporation of Illinois
Filed Sept. 13, 1965, Ser. No. 486,638
32 Claims. (Cl. 199—16)

The present invention relates to automatic magazine control mechanism for linecasting machines. More particularly, the invention is directed to magazine control mechanism which is responsive to perforated tape control, although in its broader aspects this magazine control is not necessarily limited to perforated tape control.

The present invention has been developed as an improved extension of the automatic control system disclosed in the prior co-pending application of Frederick P. Netznik and Joseph Gardberg, Serial No. 407,200, filed October 28, 1964, on "Automatic Control System for Linecasting Machines." In that application, coded tape is utilized to control a typesetting operation as a main function, and also to control a slug sawing operation as a secondary function. The coded tape is passed through a tape reader and the signal data from such tape reader operates through translating apparatus to perform the typesetting operation and the slug sawing operation. The magazine control mechanism disclosed in the present application can be combined with the system of the co-pending application to add the magazine selecting operation as a further additional function beyond the secondary function of the slug sawing operation. However, it is to be understood that the present invention is not limited to being combined with the system of the co-pending application and that it may utilize any different form of tape reader and any different form of translating apparatus than are disclosed in said co-pending application.

The general object of the invention is to provide improved automatic control mechanism for changing the magazines of linecasting machines in response to signals from a coded tape.

Another object is to provide such mechanism which will selectively perform major changes and minor changes as between the multiple magazines of machines having four main magazines; as for example in machines having main magazines numbered 1, 2, 3, and 4. The major changes will occur when a change is made from magazines 1 and 2 to magazines 3 and 4, or vice versa. The minor changes will occur when a change is made from magazine 1 to magazine 2, or vice versa, and from magazine 3 to magazine 4, or vice versa.

Another object is to provide improved mechanism which can effect an automatic tape controlled shift of the magazines in effecting a major change.

Another object is to provide improved mechanism which can effect an automatic tape controlled shift of the keyrods in effecting a minor change.

Another object is to provide improved mechanism which will automatically effect a power operated actuation of the channel entrance mechanism when making major changes involving the physical displacement of the magazines.

Another object is to provide an improved arrangement of upper level and lower level switches, adapted to respond to upper level and lower level movement of the magazines, for controlling the system.

Another object is to provide an improved arrangement of deflection switches, adapted to respond to the shifting deflection of the keyrods between front and rear positions, for controlling the system.

Another object is to provide an improved channel entrance switch adapted to respond to the change of position of the channel entrance mechanism for controlling the system.

Another object is to provide improved circuitry and associated means cooperating with the above mechanism for changing the matrix magazines of linecasting machines.

Other objects, features, and advantages of the invention will appear from the following detailed description of one preferred embodiment thereof. In the accompanying drawings illustrating such embodiment:

FIGURE 1 is a schematic outline view of a linecasting machine showing magazines 1 and 2 in operative positions, and showing magazines 3 and 4 in shifted non-operative positions;

FIGURE 4 is a fragmentary plan view of the hydraulic cylinder and other related parts which we add to the channel entrance operating mechanism;

FIGURE 5 is a transverse sectional view taken on the plane of the line 5—5 of FIGURE 4;

FIGURE 6 is a fragmentary plan view of the other hydraulic cylinder and related parts which we add to the magazine change mechanism;

FIGURE 7 is a longitudinal sectional view taken on the plane of the line 7—7 of FIGURE 6.

FIGURE 8 is a fragmentary perspective view illustrating the manual operating handle of the magazine change mechanism, and also illustrating a front safety switch responding to a matrix detector plunger and to a magazine frame operating safety lever plunger, etc.;

FIGURE 9 is a vertical sectional view, somewhat diagrammatic in nature, which illustrates the keyrods, the power operated deflecting units for deflecting the keyrods, and the switches which respond to such deflecting movements;

FIGURE 10 is a fragmentary sectional view of the distributor clutch and its associated switch;

FIGURE 11 is a transverse sectional view taken on the plane of the line 11—11 of FIGURE 10;

FIGURE 12 is a sectional perspective view of the clutch and cam mechanism of the channel entrance control mechanism;

FIGURE 13 is a fragmentary perspective view of the tripping lever and safety stop lever of said channel entrance mechanism;

FIGURE 14 is a similar view of the magazine carriage catch releasing mechanism;

FIGURE 15 is a similar view of the escapement rod depressing mechanism;

FIGURE 16 is a schematic view of the hydraulic pump unit and the electrically controlled valves which control the hydraulic flow to the different hydraulic operating units;

FIGURE 19 is a circuit diagram of the magazine selector circuit and the magazine marking circuits, and FIGURES 20–23 are circuit diagrams of the control relays in the magazine control circuit in various conditions of operation of the equipment.

The present disclosure is predicated upon actual installations made in Intertype linecasting machines, one such machine being specifically identified as an Intertype Model G4, Sales No. S022,087, Machine #32687. This model of Intertype machine in widely known to those skilled in the art. Such machines are illustrated and described in detail in a publication issued by Intertype Corporation entitled "The Intertype—A Book of Instruction for Its Operation and General Maintenance," 473 pages, Copyright 1943. This single volume publication has also been published as four separate volumes entitled:

Section I—Assembling Mechanism
    Section II—Casting Mechanism
    Section III—Distributing Mechanism
    Section IV—Magazine Frame Mechanism Much of the subject matter of this Model G4 Intertype Machine is also disclosed in the following United States patents issued to Intertype Corporation, as assignee:

1,988,417, Freund, Jan. 15, 1935
2,103,980, Freund, Dec. 28, 1938
2,199,772, Allan and Simpson, May 7, 1940
2,314,324, Allan and Simpson, Mar. 23, 1943

Figure 1:
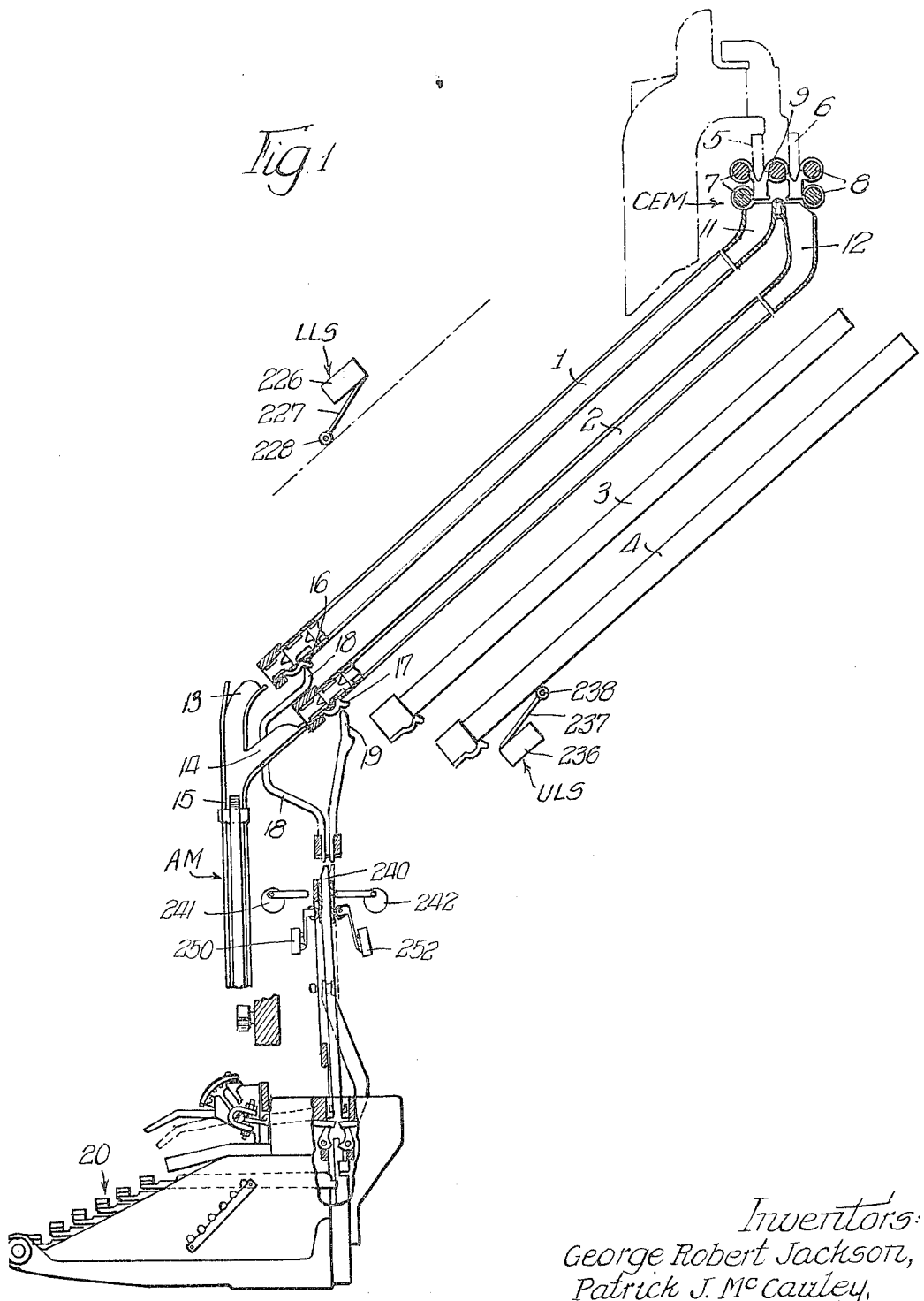

FIGURE 1 illustrates two superposed matrix magazines, typically represented by magazine No. 1 and magazine No. 2, in operative position with their upper ends in matrix receiving positions with respect to the upper channel entrance mechanism CEM, and with their lower ends in matrix discharging positions with respect to the lower assembler mechanism AM. The channel entrance mechanism CEM comprises two distributor bars 5 and 6, and front, rear and intermediate distributor screws 7, 8 and 9, respectively. This channel entrance mechanism discharges the matrices down through chutes 11 and 12 into the upper ends of the magazines; and said channel entrance mechanism is so mounted that it can be swung rearwardly out of the operative position shown for accommodating shifting of the magazines.

The assembler mechanism AM comprises upper and lower chutes 13 and 14 both discharging into a common assembler channel 15. The escapements 16 and 17 at the lower ends of the magazines are adapted to be actuated by escapement rods 18 and 19. As is well known, when the magazines are shifted the lower ends thereof are lifted to clear the escapement rods. The keyboard of the linecasting machine is fragmentarliy indicated at 20.

Figure 2:
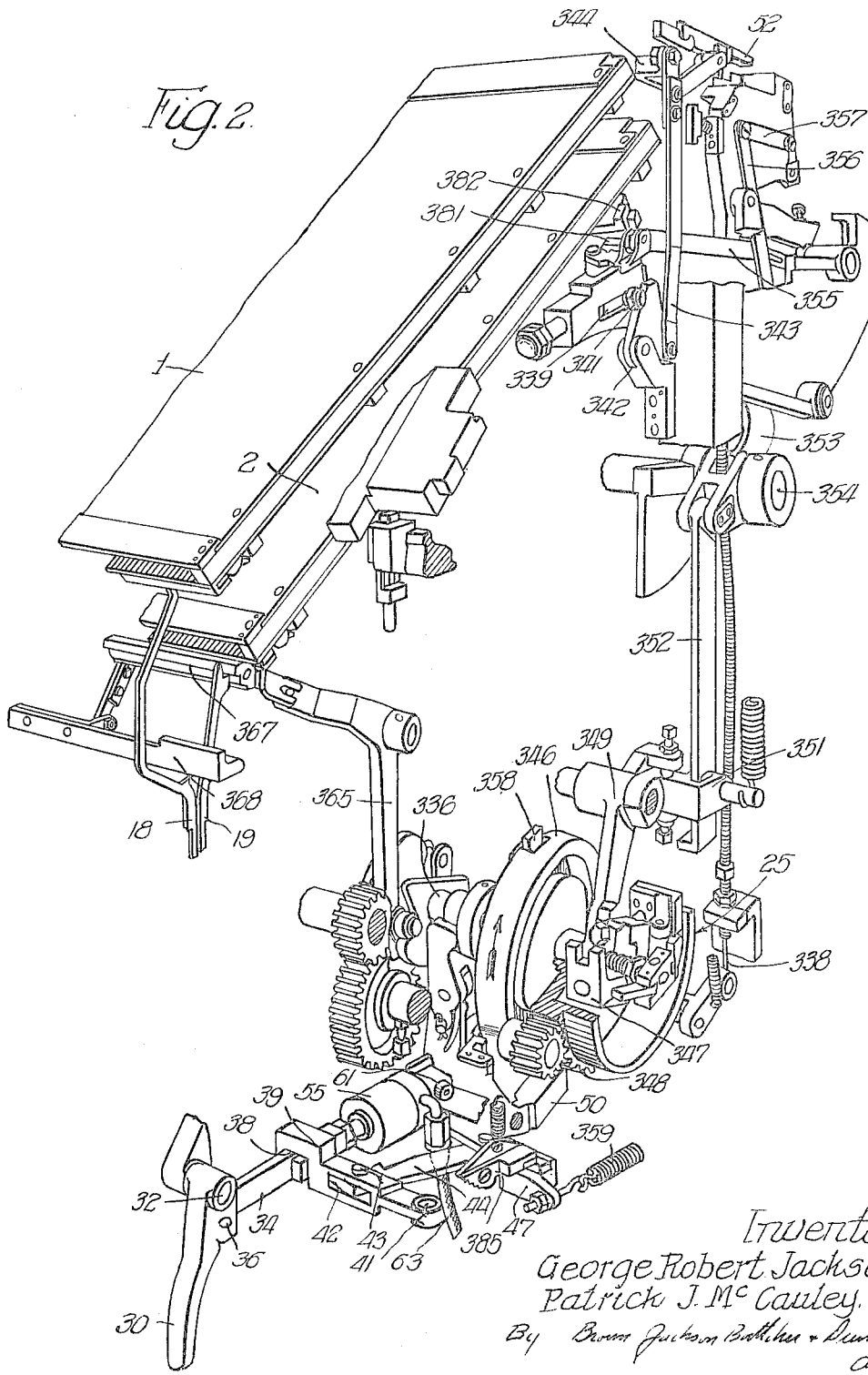
FIGURE 2 is a fragmentary perspective view of that part of a linecasting machine having to do primarily with the channel entrance operating mechanism, and showing our invention embodied in such channel entrance operating mechanism.

Referring now to FIGURE 2, this illustrates the train of parts which effects the power operated opening and closing of said channel entrance mechanism CEM. The power mechanism for performing this opening and closing operation is activated by a power clutch 25 which is adapted to be tripped by a manually operating lever 30 mounted at the front of the machine. Such lever is pivotally mounted at 32, and has a rearwardly extending link 34 pivoted thereto at 36. The rear end of this link has pivotal connection on a pivot pin 37 passing through a clevis 38 formed at one end of a motion transmitting lever 39 which is pivoted on a vertical pivot axis 41 (see FIGURES 4 and 5). Pivoted within a slotted clevis opening 42 in this lever on a pin 43 is a rearwardly extending link 44 which has its rear end pivoted on a pin 45 passing down through a slotted clevis opening 46 of a pawl tripping lever 47 (see FIGS. 12 and 13). This tripping lever 47 is pivoted at 48 and is adapted to latch in front of a stop 50. From this stop 50 a train of mechanically interconnected parts extends up to a latch 52 adjacent to the top of the machine which, when it is unlatched, releases the channel entrance mechanism CEM, leaving it free to be opened by the power driven clutch mechanism. This is all illustrated and described in "The Intertype" publication, see pages 303 to 312 together with accompanying FIGURES 171 to 175.

When the channel entrance is to be opened, the operating lever 30 (FIGURE 2) is pulled forward. As previously described, the operating lever is connected with the pawl trip lever 47 by link 34, lever 39 and link 44. Forward movement of lever 30 therefore causes lever 47 to pivot on its fulcrum and to latch in front of stop 50. At the same time, pawl 330 (FIGURE 12) is moved clear of the stop and since the pressure of lever 47 has been released from bracket 331 in the lower end of clutch fork 332, flange 333 and clutch rod 334 are permitted to move to the left. The flange is connected with the clutch rod by a screw, and a compression spring 335 inside cam shaft 336 causes the rod and flange to move to the left. When the clutch rod moves in, the friction shoe facings 337 are pressed against the revolving clutch drum 26 by the linkage illustrated in FIGURE 12.

As soon as the friction shoe facings engage the clutch drum, the channel entrance latch is released so that the entrance can be opened. The channel entrance latch 52 is released by cable 338. When the cable draws the magazine releasing rod block 339 back, the roll on screw 341 depresses cam 342 and causes link 343 to move down. Latch lever 344 is thereby raised under latch 52 and the latch is disengaged from its hook, leaving the channel entrance free to be opened by the clutch mechanism.

The opening of the channel entrance is promoted by the operating cam 346. As the clutch arm 347 turns with gear 348, cam 346 is turned in the same direction. The groove in the operating cam controls the opening and closing movements of the channel entrance. The movement of the cam is imparted to the channel entrance through cam lever 349, auxiliary lever 351, link 352 and the left and right hand magazine lifting levers, the latter of which is shown at 353. As the lifting levers, which are pinned to shaft 354 pivot with the shaft, the channel entrance is moved away from the magazines and toward the back of the machine by releasing link 355, lever 356, and link 357. When the channel entrance is fully opened, pawl 358 (FIGURE 2) banks against stop 50 and moves the stop forward far enough to disengage trip lever 47. Spring 359 (FIGURE 12) then causes the trip lever to bear against the roller in bracket 331 and fork 332 pushes clutch rod 334 out, thereby relesaing the clutch by drawing the clutch facings 337 away from the drum 26. When the channel entrance is to be closed, lever 30 is pulled forward and the clutch mechanism operates as hereinabove described.

When the channel entrance is opened manually to its furthest position from the rear of the machine, the channel entrance releasing links 355 (FIGURE 2) are temporarily disengaged from the operating levers 356. It is obvious, then, that if operating lever 30 at the front of the machine is manipulated to close the entrance, the operating parts will function but the entrance, being disengaged from the operating levers will simply remain in its opened position. The channel entrance can be closed by hand from the rear of the machine in this instance, but to avoid confusion, the entrance should always be closed from the rear of the machine if it was opened from the rear originally. In opening the entrance manually, it is necessary to lift the releasing links 355 before depressing the channel entrance latch 52.

When the channel entrance operating clutch begins to operate, the escapement rod depressing mechanism is operated by a cam 366 (FIGURE 15) on cam shaft 336. The cam level 365 engages an extension on the back depressing lever 367 which is connected with the front depressing lever 368 by a link. When the channel entrance clutch operates and rotates cam 366, the front and back depressing levers are lowered against their respective escapement rods. If one of the rods has remained in its raised position therefore, it will be returned to normal position before the magazine and its carriage are withdrawn. For a perspective view of the escapement rod depressing mechanism in relation to the assembled channel entrance mechanism, see FIGURE 2.

Whenever the channel entrance is opened, the lower magazine in operating position is released and withdrawn from between the front and back sets of escapement rods. The magazine releasing mechanism is shown in FIGURE 14. The magazine carriage catch 369 is released by the bell crank lever 370 pivoted on the right hand magazine lifting lever 371. The bell crank is operated by releasing cable 338, which is connected with cam lever 373 pivoted in the gear case. Cam roll 374 on the lever is held against cam 375 by spring 376. When the channel entrance operating lever is pulled forward and the clutch begins to operate, the releasing cable assembly causes the bell crank 377 to push in the magazine carriage catch 369 and holds the catch in its released position until the magazine has been withdrawn fully at which point the catch is released and is permitted to lock the magazine carriage in its upper position. The magazine and carriage will be locked in this inoperative position until they are returned again to operating position.

The mechanism which lifts the lower magazine between the front and back sets of escapement rods is shown in FIGURE 2. The lifting of the magazine and its carriage is effected by the left and right hand lifting levers, the latter of which is shown at 353. The magazine is lifted simultaneously with the opening of the channel entrance through movement imparted by cam 346. As the lifting levers pivot with shaft 354, two shoes 381 engage blocks 382 fastened to the magazine carriage and withdraw the lower magazine in operating position from between the escapement rods 18 and 19.

A safety stop lever 385 (FIGURE 13) is provided to lock the operating lever 30 whenever the magazine frame is not fully seated in any of its various operating positions. The stop lever is pivoted on a shoulder screw so that its front end can be raised and lowered with respect to the pawl trip lever 47. A cable 386 (FIGURE 13) connects the stop lever with a plunger 387 at the right of the main magazine frame. When the frame is fully seated in any of its operating positions, it banks on the plunger and causes the cable 386 to raise the front end of stop lever 385 a very slight distance (approximately 1/64") above the trip lever 47. This leaves the trip lever free and the channel entrance operating lever may be pulled forward to close the channel entrance. If the magazine frame does not seat fully in operating position, however, stop lever 385 (FIGURE 13) will remain in front of trip lever 47 and the operating lever 30 will be locked by the linkage illustrated. When the obstructing condition has been removed and the magazine frame is fully seated, the stop lever will be raised and the channel entrance mechanism will operate normally (see pages 303–307 of "The Intertype").

FIGURES 4 and 5 illustrate the only changes which are required to be made in the mechanism of FIGURE 2, in the adaptation of our invention to such mechanism. To provide for tape controlled automatic operation of the channel entrance mechanism CEM, we introduce a hydraulic cylinder or ram 55 so arranged as to operate in parallel with the manual lever 30. In this modified adaptation, a slightly modified design of lever 39 is substituted for the standard lever, this modified design having a downwardly facing clevis 38' having a slightly wider clevis opening. The wider clevis opening 38' accommodates the pivot tongue 59 along with the rear end of the link 34. This pivot tongue 59 establishes pivotal connection between the front end of the cylinder piston rod 60 and the above described linkage 34, 44, etc. The rear end of the cylinder has pivotal attachment to the frame of the machine by way of a mounting fixture comprising a bracket 61 fixed to the side of the machine together with a pivot bolt 62 (FIGURE 4), this mounting fixture providing for pivoting on two axes at right angles to each other so as to accommodate the swinging movement of the hydraulic cylinder. A hydraulic hose 63 couples up to this rear end of the cylinder through a coupling nipple 64 for supplying hydraulic fluid pressure to this end of the cylinder. The admission of such fluid pressure operates to extend the ram, thrusting the piston rod outwardly in a forward direction, this motion being in opposition to a tension spring 359 connected to the pawl tripping lever 47, and also in opposition to a return spring within the cylinder. This outward thrusting motion of the piston rod causes the same identical motion of the operating parts as is caused by outward pulling motion on the manually operating handle 30. Thus, the extension and contraction of the hydraulic ram cylinder 55 results in the same operation of the channel entrance mechanism CEM as is illustrated and described in pages 303–312 of "The Intertype" publication.

Figure 3:
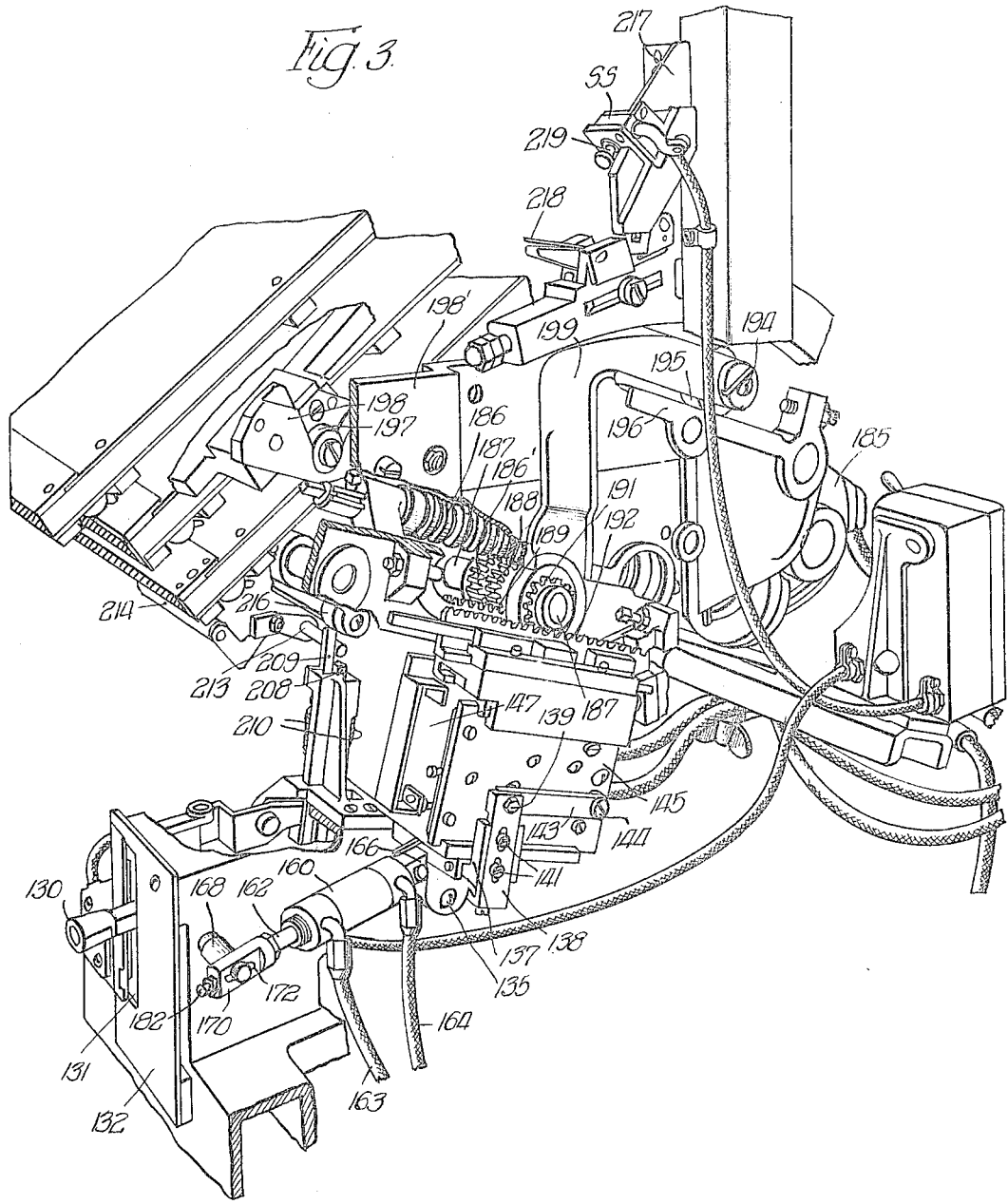
FIGURE 3 is a similar view of another part of the linecasting machine having to do primarily with the magazine change mechanism, and showing our invention embodied in such magazine change mechanism.

Referring now to FIGURE 3, this illustrates the mechanism which performs the operation of power shifting the magazines through the actuation of manually operating lever 130 which is located at the front of the machine, preferably in proximity to the other manual lever 30. This latter lever 130 moves up and down within a vertical slot 131 in a front cover plate 132 (FIGURE 3). For manual operation, the lever is adapted to be moved manually into either one of three different control positions in the slot 131, i.e., a top position, a bottom position and an intermediate position. The upper position locates the lower pair of main magazines in operating position, the lower position locates the upper pair of main magazines, and the center position locates the middle pair of main magazines. The rear end of the lever 130 is mounted on a rock shaft 135 suitably supported in bearings on the machine. The right hand end of this rock shaft carries a swinging arm 137 which in turn carries an extensible arm 138 provided with a pivot bolt 139 at its upper end. The extensible arm 138 is secured to the swinging arm 137 by slots and screws 141 which enable the extensible arm 138 and the upper pivot 139 to be raised or lowered relatively to the center of the rock shaft 135. Pivotally mounted on the upper pivot 139 is a rearwardly extending link 143 which has its rear end pivotally connected at 144 to a cover plate 145 of the switch box 147. The cover plate 145 is mounted for back and forth sliding motion relatively to the switch box 147, resulting from the to-and-fro shifting motion imparted to such plate by the link 143. Mounted on the inner side of the plate 145 are cams which control two switches inside the switch box 147. The switch box 147 is also mounted for to-and-fro sliding motion relatively to the cover plate 145, this being in response to shifting movement from the magazine power drive mechanism. For example, as the magazine frame is moved upwardly and forwardly the switch box is moved backwardly as will be later described. For an understanding of the construction and operation of the switch mechanism contained within the switch box 147, attention is directed to the illustrations and description on pages 377 to 393 of "The Intertype" publication. Attention is also directed to Allan and Simpson Patent 2,199,772, issued May 7, 1940, on "Typographical Composing Machine." In this patent, and particularly in the alternative or modified embodiment illustrated in Figures 21 to 30 inclusive and described on pages 9 to 12 inclusive of the specification, there is a full and complete disclosure of the operation of the aforementioned switch mechanism 145–147.

To provide for the tape controlled automatic operation of the magazine selecting and shifting mechanism we provide a hydraulic two-way cylinder or ram 160 so arranged as to operate in parallel with the manual lever 130 (FIGURE 6). The rear end of the cylinder 160 has pivotal connection with the rock shaft 135 through a crank arm 166 which may be fastened directly to the rock shaft 135 or to the swinging crank arm 137, whereby rearward extension of the ram cylinder will rotate the rock shaft 135 in a clockwise direction for shifting the slidable switch plate 145 rearwardly toward the right. The connection of the front end of the piston rod 162 to a fixed anchorage stud 168 is established through a slotted link 170 which affords a lost-motion connection to compensate for any difference between the fixed length of stroke of the ram cylinder and the permissible length of stroke existing between the stud 168 and the crank arm 166 in its actuated position.

Referring to FIGURES 6 and 7, this slotted link lost-motion arrangement comprises a link 170 having a slot 172 therein which has slidable mounting over the fixed stud 168 which is secured to a stationary point of anchorage 174. The inner end of this slotted link has a threaded socket 176 therein into which screws the threaded end of the piston rod 162. In making compensating adjustments, the piston rod is adapted to be screwed either inwardly or outwardly in the socket 176, and to be held in any adjusted position therein by a lock nut 178. The opposite end of the slotted link has a threaded bore 180 extending inwardly into the end of the slot 172, which is adapted to receive an abutment screw 182 which can be threaded inwardly or outwardly to vary the effective length of the slot 172. A lock nut 184 serves to hold the abutment screw in any desired position of adjustment. It will be seen that the distance between the end of the abutment screw 182 and the other end of the slot 172 can be adjusted to a distance corresponding to the amount that the stroke of the ram cylinder exceeds the permissible length of the stroke of the crank arm 166 between its retracted position and its extended operative position in shifting the switch plate 145. This permissible length of stroke also corresponds to the permissible length of stroke of the lever 130 moving between the top and bottom ends of the vertical slot 131. Thus, the full operating pressure of the hydraulic ram can be brought to bear for shifting the switch plate 145, but without subjecting any parts to undue pressure at the limits of the permissible range of movement of the shiftable switch plate 145 or of the operating lever 130. The single hydraulic hose 63 which connects with the one-way hydraulic ram 55, and the two hydraulic hoses 163 and 164 which connect with the two-way hydraulic ram 160, are selectively charged with fluid pressure at predetermined times in the operating cycle of the machine, as will be later described.

The power shifting of the magazines is effected by an electric motor 185 (FIGURE 3) which drives a worm 186 meshing with a worm gear 186'. The worm gear operates through shaft 187 to drive pinions 188 which run on racks 189 for carrying the magazines between upper and lower positions. As the shaft 187 moves forward, a pinion 191 pinned to the shaft moves the control switch rack 192 backward. This rack is bolted to the switch box 147, with the result that as the magazine frame is moved forward, the rack 192 and the switch box are moved backward, as previously described. A shaft 194, FIGURE 3, is inserted through lugs of the magazine frame, and a roll 195 at each end of the shaft supports the assembly on left and right hand brackets, the latter of which is shown at 196.

The magazine frame is further supported at its lower end by two rollers 197 which run on two lifting cams 198 fastened to the supporting brackets 198'. The motion of the rollers on these cams 198 serves the purpose of raising the magazines clear of the escapement rods. The magazine frame upper shaft 194 is connected with the lower shaft 187 by two links 199. As above described, the lower shaft 187 is power driven through the worm 186 and worm gear 186' and carries the drive pinions 188 which run on the racks 189 fastened to the supporting brackets. From the connections outlined above, therefore, it is apparent that the magazine frame lower shaft 187 promotes the forward and backward movements of the magazine frame. When the lower shaft moves forward, the magazine frame is moved in the same direction by the links 199 and shaft 194; backward movement of the magazine frame is effected by the same means. It is believed that the foregoing adequately describes how the magazines are moved between their upper and lower positions. In this regard, attention is directed to pages 377–393 of "The Intertype" publication for further descriptive material and illustrations thereof. Attention is also directed to the disclosures in Patents 2,199,772, 2,103,980, and 2,314,324.

Reference will now be made to certain safety devices and switches embodied in our invention to safeguard the operation thereof. Referring first to a safety switch SS which is mounted on a guide 217 at the upper portion of the machine, this switch is actuated by a spring 218 mounted on lifting lever 219. When the lifting levers withdraw the lower magazine and open the channel entrance, this spring 218 bears against switch SS. The switch is connected with the magazine frame operating circuit, as will be later disclosed, and when the switch is closed as described, the magazine frame mechanism will operate normally. If an obstructing condition is present however, lifting lever 219 will not move back far enough to close switch SS and it will be impossible to start the magazine frame operating motor. The solution to this problem is to locate and correct the obstruction which is preventing the channel entrance from opening all the way, or the condition which is interfering with the raising and latching of the magazine in the lower operating position. Switch SS is closed when the channel entrance is fully opened and the lower magazine in operating position is raised and latched. This switch SS per se is standard equipment on the Intertype machine, but its contacts have been embodied electrically in the circuitry portion of the invention (pages 381–82 in "The Intertype").

Referring now to a front safety switch FSS (FIGURE 8) located at the front of the machine, adjacent to the magazine control lever 130, this switch responds to a matrix detector plunger 208 and also to a magazine frame safety lever plunger 209. The switch FSS comprises a spring projected button 201 arranged to be depressed by a switch actuating arm 202 carrying a roller 203. This actuating arm is adapted to be depressed by a lever 204 which is pivotally mounted at 205 and has one lever arm 206 in position to bear downwardly against the roller 203. The other arm 207 of said lever 204 is adapted to respond to the joint movement of the two plungers 208 and 209 carrying pins 208' and 209' at their lower ends adapted to have hooking engagement under the latter lever arm 207. These plungers are normally impelled in an upward direction by springs 210. A tension spring 210' is connected to normally hold the lever arm 206 swung upwardly and the lever arm 207 swung downwardly against the two plunger pins 208' and 209'. The plunger 208 constitutes the matrix detector plunger and is operated at its upper end by a stud 213 in the right hand lever of the matrix detector rod 214 (FIG. 3). When the channel entrance is opened and the lower magazine in operating position is withdrawn from between the escapement rods, the matrix detector rod 214 moves up in front of the magazine. If the front of the magazine is clear, the rod moves up to its full stroke and plunger 208 is depressed all of the way. This removes plunger pin 208' from a position where it can block the counterclockwise swinging movement of lever 204. If a matrix is protruding from the magazine in the lower operating position, however, the matrix detector rod 214 will bank against the matrix and will be prevented from making its full upward stroke. Plunger 208 will not be depressed in this instance, so that safety lever 204 will continue to be held in the position illustrated. To remedy the obstructing condition, it is necessary only to move forward the hinged upper assembler entrance. The protruding matrix can then be removed and safety lever 204 will assume its normal position.

The other plunger 209 is the safety lever plunger and operates the swinging lever 204 exactly as described in the case of the matrix detector plunger 208. This safety lever plunger is operated at its upper end by a roller 216 (FIG. 3) on the magazine frame lifting shaft. When the magazine frame is lifted at its front end in preparation for a change of magazines, the plunger 209 is permitted to move upwardly. As soon as the frame is lowered, the roller 216 depresses the plunger 209.

FIGURE 1 schematically illustrates the uppr limit and lower limit switches which respond to the limit positions of the magazines. The lower limit switch LLS comprises a switch housing 226 from which an operating lever or arm 227 extends, carrying a roller 228. This switch is positioned at the front of the machine to be engaged by the frame of magazine 2 when the latter is in its uppermost forward position, whereby to signal that the magazines are at the upper limits of their movement. This is the position for assembling from magazines 3 and 4.

The upper limit switch ULS likewise comprises a switch housing 236 from which an operating arm or lever 237 extends, carrying a roller 238. This switch is positioned at the back of the machine to be engaged by the frame of magazine 4 when the latter is in its lowermost position, whereby to signal that the magazines are at the lower limits of their movement. This is the position for assembling from magazines 1 and 2.

Figure 9:
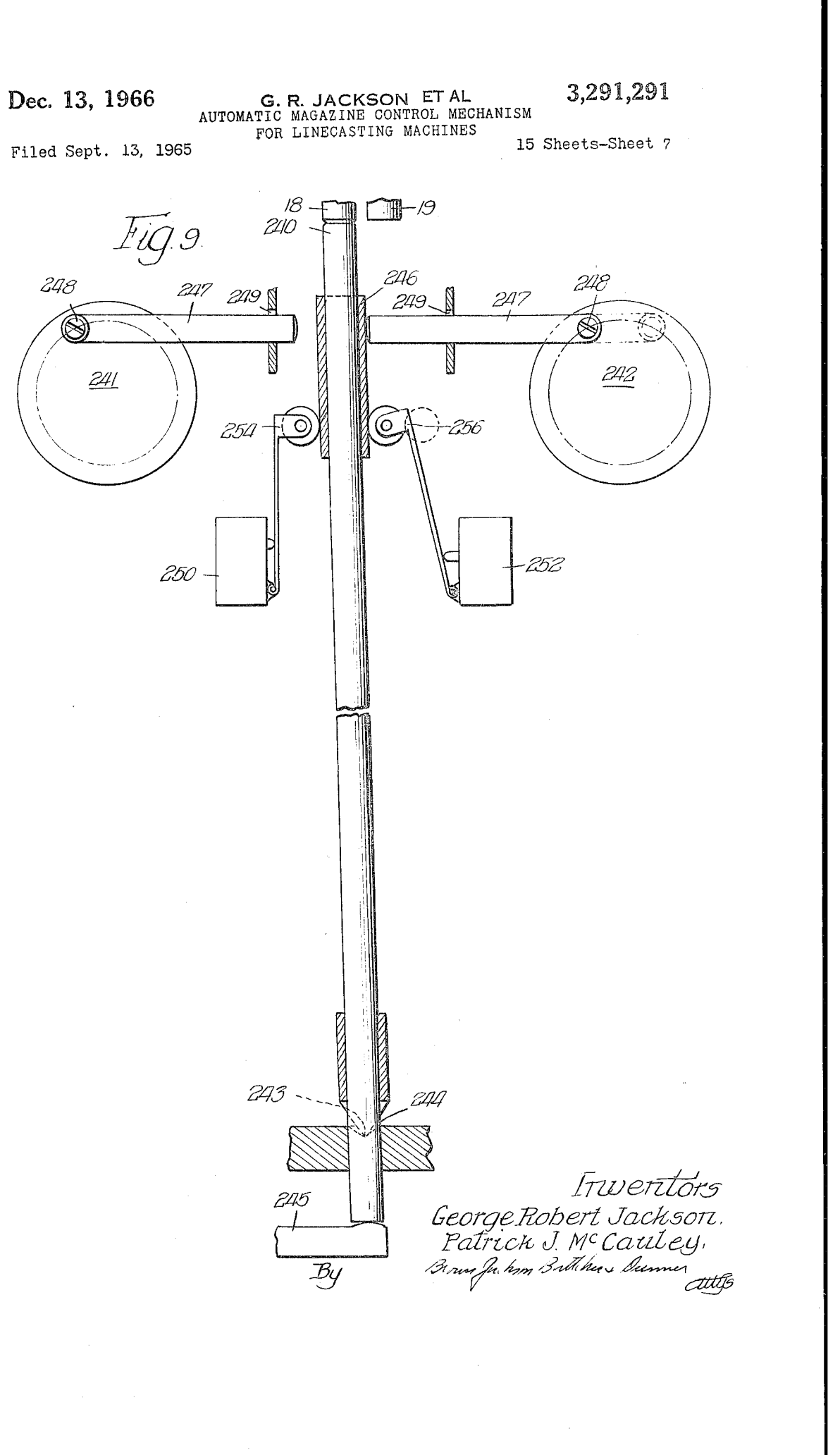

In FIGURE 9 we have illustrated the front and back electrically powered units 241 and 242 which shift the reeds or keyrods 240 between their forward and rearward positions. In their forward positions the keyrods 240 operate the front or upper escapement rods 18, and in their rearward positions they operate the rear or lower escapement rods 19. The electrically powered units 241, 242 are preferably the same, merely having their operating strokes acting in opposite directions so that the forward acting unit will press in a forward direction against the keyrod frame 246 and the rearward acting unit will press in a rearward direction against the keyrod frame 246. These electrically powered units are preferably "Ledex" rotary solenoid motors which upon energization develop a thrusting force which is brought to bear against the keyrod frame 246 for deflecting the frame either forwardly or rearwardly. These "Ledex" rotary solenoid motors are manufactured by Ledex, Inc., of Dayton, Ohio. They have a magntically impelled forward rotary stroke, followed by a spring impelled rotary return stroke.

Their arcuate stroke is made operative to transmit a thrusting stroke to the keyrod frame 246 through a thrust rod 247 which is pivotally connected to the rotor through a crank pin 248 and which slides through a fixed guide aperture 249. The inner end of the thrust rod is adapted to impart swinging motion to the side of the keyrod frame 246, whereby when the frame is deflected forwardly, the keyrods will assemble matrices from magazines 1 or 3, and when the frame is deflected rearwardly the keyrods will assemble matrices from magazines 2 or 4. The lower portion of the keyrod frame 246 has aligned wedge shaped fulcrums 243 which has rockable mounting in V-shaped notches 244 in the machine frame. The lower ends of the keyrods 240 are thrust upwardly by the keyboard cam yokes 245.

Front and rear keyrod or reed position switches 250 and 252 are made responsive to this forward and rearward shifting movement of the keyrod frame 246. These switches are of any conventional form having switch actuating arms 254, 256 adapted to engage opposite sides of the keyrod frame 246 so as to be pushed into switch actuating positions by the forward and rearward movement of the frame. When the actuator on the front reed switch 250 is depressed this indicates that the keyrod frame 246 is in line to allow the keyrods 240 to actuate the front escapement rods 18, which corresponds to magazine 1 or to magazine 3. When the actuator on the back reed switch 252 is depressed this indicates that the keyrod frame 246 is in line to allow the keyrods to actuate the rear escapement rods 19, which corresponds to magazine 2 or to magazine 4.

The upper and lower limit switches ULS and LLS operate in conjunction with the front and rear keyrod switches 250 and 252. For example, the actuation of the lower limit switch LLS denotes that the assembling of matrices can take place from either magazine 3 or magazine 4. At this time, the actuation of the rear keyrod switch 252 establishes that the assembling of matrices will take place from magazine 4; and conversely the non-actuation of the rear keyrod switch 252 establishes that the assembling of matrices will take place from magazine 3.

Referring now to the upper limit switch ULS, the actuation of this switch denotes that the assembling of matrices can take place from either magazine 1 or magazine 2 at this time. At this time the actuation of the front keyrod switch 250 establishes that the assembling of matrices will take place from magazine 1; and conversely the non-actuation of the front keyrod switch 250 establishes that the assembling of matrices will take place from magazine 2.

FIGURES 10 and 11 illustrate an open channel switch OCS which responds to the opened and closed positions of a channel distributor clutch 260. This clutch is mounted on a distributor clutch shaft 262 which is operatively connected to drive the distributor screws of the machine. The clutch comprises a belt pulley 264 revolving freely on the shaft 262 and provided with a radial clutch face 266. A clutch disk 268 of frictional material is compressed against the clutch face by a shiftable clutch flange 270 formed integral with a shiftable clutch sleeve 272. The clutch sleeve is keyed to the shaft 262 by a key 274 for endwise sliding movement, and is normally thrust into clutch engaging position by a compression spring 276. Projecting from the sleeve 272 is a collar 277 having scalloped teeth 278 formed in one face thereof, these teeth having circumferentially flat dwells 280 at the tips thereof. Cooperating with these scalloped teeth is a tapered screw 282 carried in a rotatably mounted clutch lever 284. This clutch lever 284 normally stands in the position illustrated with the tapered pin or screw 282 withdrawn from the path of the scalloped teeth 278. Through an old and well known form of tripping mechanism (pages 314–15 in "The Intertype"), this clutch lever 284 is made responsive to the clogging of any matrices in a channel of the channel entrance, such clogging causing the lever to swing in a clockwise direction (FIG. 11). This swings the tapered screw 282 up into position to engage the scalloped teeth on the rotating collar 277, which immediately cams the clutch flange 270 toward the left for releasing the clutch and thereby stopping the rotation of the distributor screws. This motion of the clutch lever 284 actuates the open channel switch OCS, which has an actuating arm 288 normally pressing upwardly against the underside of the tapered screw 282. When the clutch lever 284 is moved upwardly into the clutch releasing position, the switch contacts move into one position; and when the clutch lever is moved downwardly into its normal clutch engaging position, the switch contacts move into another position.

In FIGURE 16, we have illustrated diagrammatically the hydraulic pressure unit 300 for supplying hydraulic pressure to the various hydraulically actuated mechanisms of the system. An electric motor 302 is connected to drive a hydraulic pump 304 contained in or connected with the hydraulic liquid tank 306. This pump preferably runs continuously during the operating interval of the linecasting machine, and a master valve MV cooperates with this continuous operation, whereby a supply of hydraulic fluid under pressure is instantly available during the entire operating interval of the linecasting machine. This pressure supply is conducted through an output manifold 308 to a series of electromagnetically controlled valves CV, LMV, UMV and KBV. Each of these valves is a three-way valve having an inlet port connecting with the output manifold 308, an outlet or supply port connecting with the hydraulically responsive unit, and a return port connecting with a return manifold 312 for returning the fluid to the tank 306. The valve CV is connected through conduit 63 to the channel entrance operating cylinder 55; the valve UMV is connected through conduit 163 to the left hand end of the two-way cylinder 160 for making a major selection of magazines 1 and 2; the valve LMV is connected through conduit 164 to the right hand end of the two-way cylinder 160 for making a major selection of magazines 3 and 4; and the valve KBV is connected through conduit 218 with the knife block mechanism of the aforementioned co-pending application Serial No. 459,845.

ELECTRONIC CONTROL CIRCUIT FOR MAGAZINE CONTROL MECHANISM

The novel control circuit disclosed hereinafter for effecting automatic shifting of the magazine units on a linecasting machine to different positions is especially adapted for use with a linecasting machine which is operated by information provided on a perforated tape, although as will be apparent from the following disclosure, the novel control circuit may also be used with signal inputs of other types. Additionally although the control circuitry for the magazines may be used on a linecasting machine which does not have other types of automatic control equipment, in the preferred embodiment described herein, the novel magazine control circuitry is adapted for use on an automatic linecasting machine which further includes saw control means for effecting the automatic positioning of a saw in response to a tape signal input, knife control means for effecting automatic positioning of an adjustable knife relative to the stationary knife in response to a tape signal input, and mold disc control means for effecting the automatic positioning of the mold disc to a desired position in response to a tape signal input. In the interest of enabling a more clear understanding of the function and purpose of the magazine control equipment, and its sequence of operation with such additional equipment, a brief general description of the operating relationship of such linecasting apparatus and circuitry in a typical operation is first set forth herein.

Figure 17:
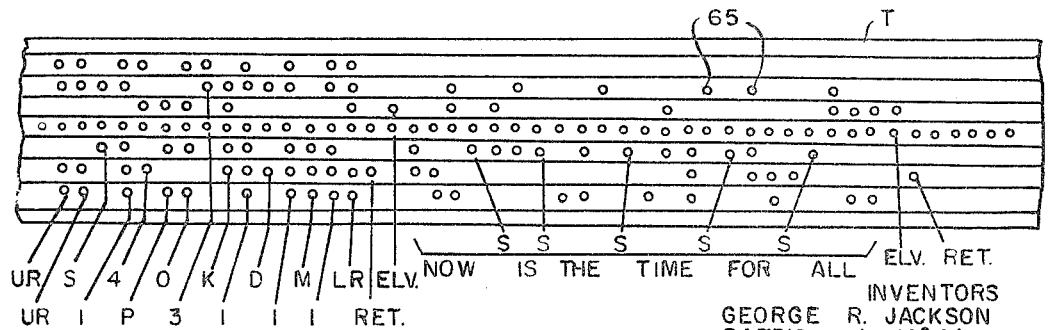
FIGURE 17 is a showing of a representative tape member used to provide information relative to both linecasting and command functions.

With reference first to FIGURE 17, a segment of a tape T is shown thereat. As there illustrated, one set of coded information on the tape (Now is the, etc.) is typical of the signals which are placed on the tape for the purpose of indicating the message to be cast on the slugs. A second set of signals on the tape is illustrative of codes (UR, UR . . . M1) for achieving automatic operation of the saw, knife block, mold disc and magazine control units. In use, the tape T is fed to a conventional tape reader TR on the linecasting machine which senses the codes on the tape and controls either the linecasting equipment in the casting of slugs, or the control circuitry in the automatic setting of the equipment used to produce the slugs.

More specifically, the tape T in the disclosed system has six longitudinal rows or levels which are punched in different bit combinations up to six, and disposed transversely in six different levels on the tape member. As the tape T is advanced, step by step, through the tape reader TR, and as each transverse line of single perforations enters the sensing zone of the reader, sensing fingers or plungers determine the presence of the perforations and the tape level in which they occur, and a set of contact fingers CS0–CS5 operate in accordance therewith.

Thus, as the tape T advances a representative set of coded signals such as shown in FIGURE 17 (i.e., LR, RET now . . . all) below the reader TR, the coded signals are sensed by the sensing fingers CS0–CS5, and in known linecasting machine operation six code bars operate to select the character indicated. The selected code bars are thereafter triggered by a mechanical action to drop the desired character from the effective one of a plurality of magazines on the linecasting machine (four in the present embodiment) to the assembling elevator.

As the tape advances to effect the selection of the successive characters, the line is assembled in known manner. After the line is assembled, an elevate signal on the tape is readout, and in normal operation, the line is delivered to the assembled elevator, and thence to the delivery slide for the full cycle of casting, trimming and sawing to length.

However, in the event that a set of function control signals precedes the next line on the tape (i.e., a request for a change of slug length which requires resetting of the saw position before the next line) the cycle for the next line (i.e., "n," "o," "w,", etc.) will occur only after the requested functional controls have been effected.

As shown in the exemplary tape of FIGURE 17, the functional control signals there illustrated comprise a pair of upper rail signals UR, UR, a saw positioning signal S followed by two digits "1" and "4" which indicate the pica position desired for the saw, a spacer letter P followed by two digits 0 and 3 indicating the point position of the desired saw setting, the letter K and the digit 1 indicating that the knife block is to be adjusted to position 1, the letter D followed by the number "1" indicating that the mold disc is to be adjusted to the position 1, the letter M followed by digit 1 indicating the equipment is to be adjusted to select matrices from magazine 1, the letters LR which constitute a lower rail signal, the letters RET which constitute a return signal, and the letters EL which constitute an elevate signal.

The control circuitry is responsive to the receipt of two upper rail signals UR, UR to automatically effect adjustment of the equipment to the command position and blocking of the equipment from normal typesetting response.

Thereafter in response to the signals S14P03 the control circuitry is operative to effect adjustment of the saw to the 14 pica 03 point position as set forth in detail in the above identified copending application. Briefly, as the tape advances to effect readout of the two upper rail signals UR, UR, a selector mechanism in the system controls a blocking bar to move from its normal typesetting position to its control or type-blocking position. The blocking bar remains in such position during the readout of the subsequent signals on the perforated tape with the exception of the lower rail signal and of the elevate signal so that the typesetting equipment will not respond to the coded information which appears on the tape after the letters UR, UR. After the code UR, UR has shifted the equipment to the command position, and the letter S is registered on the code switches CS0–CS5 (FIGURE 18), reset contacts R open to permit the control circuits to respond to the command markings, and a bit switch operates to read the letter S as marked on the code switches CS0–CS5 into a matrix M.

The matrix M may be of a structure in which markings on the input conductors M0–M5 in a six unit binary code are translated into markings on digit conductors N1–N0 to indicate the receipt of digits 1–0 (the upper edge of matrix M) and markings on the horizontal conductors $0, \overline{0} \ldots 5, \overline{5}$ to indicate the detection of letters K, D, M, P and S (the right hand side matrix M). A specific matrix which is so operative is disclosed in detail in the copending application which was filed by Frederick P. Netznik and Patrick J. McCauley on May 28, 1965, and received Serial No. 459,792.

With readout of the letter S by the code switch CS0–CS5, the matrix M marks conductor S with a negative potential signal and the saw positioning circuitry SPC is prepared in response thereto to respond to the further signals which relate to the resired saw position. Thus, as the pica digit (14), spacer character (P), and point digits (03) are received by the matrix M, the digit conductors DC and character conductors SP to the saw position circuitry SPC are energized accordingly.

The saw positioning circuit SPC operates a 4R relay (not shown) which opens the energizing circuit for the elevate circuitry (not shown) and operates the saw position motor SPM to set the saw to the point and pica position which has been requested. After such setting has been accomplished, the saw position circuitry SPC terminates the saw position adjustment, and sends a signal to indicate to the circuitry that the desired positioning of the saw has been accomplished. At such time the 4R relay restores to complete a part of the elevate circuitry. However, as will be shown, the elevate solenoid ES will only operate after the tape has been advanced to effect readout of the elevate signal which appears at the end of the command information.

Additionally, as disclosed in the copending applications having Serial Nos. 459,792, 459,845, both of which were filed May 28, 1965, by Frederick P. Netznik and Patrick J. McCauley, and assigned to the assignee of this application, novel control circuitry is also operative (a) in response to the code K1 signals on the tape T to adjust the knife block to the first position of seven predetermined positions, (b) in response to code D1 signals on the tape T to adjust the mold disc to the first position of six available positions, and as will be shown hereinafter (c) in response to code signals M1 to adjust magazine 1 to the position at which matrices are selected from magazine 1.

More specifically, as the tape T advances, and the knife block, mold disc, and magazine code signals K1, D1 and M1 respectively are successively sensed by contacts CS0–CS5 (FIG. 18), and fed into matrix M, the matrix horizontal output conductors 0, $\bar{0}$ . . . 5, $\bar{5}$ are marked to energize, in sequence the conductors K, N1, N0; D, N1, N0; and M, N1, N0.

By way of specific example, with the sensing of the code signals for character "K" by contacts CS0–CS5, horizontal output conductors $\bar{0}$, 1, 2, 3, 4 and $\bar{5}$ are marked, and a negative potential signal is transmitted over conductor K to the knife block control circuit to indicate that a knife block setting is required. With sensing of the digit immediately subsequent to the letter K (digit 1 in the present example), matrix M marks conductor N1 with a negative potential signal which is transmitted to an input circuit for a latching circuit in the knife block control circuit, the mold disc control circuit and the magazine control circuit. As will be shown, since the letter "K" was sensed immediately preceding the digit 1 only the latching circuit associated with the knife block control circuit is enabled to register the digit 1 at this time. Additionally, matrix M places a negative potential signal on conductor N0 each time a digit conductor N1–N9 is energized to reset the knife block selector circuit after the appropriate latching circuit is operated.

In a similar manner, as the tape advances and contacts CS0–CS5 effect readout of the signals for character "D" the horizontal output conductors $\bar{0}$, 1, $\bar{2}$, $\bar{3}$, 4, $\bar{5}$, are marked in matrix M, and a negative signal is extended over conductor "D" to the mold disc control circuit MD to indicate a request is being received for a mold disc position adjustment. As the digit occurring after the letter D (digit 1 in the present example) is read out, conductor N1 of matrix M is marked to the inputs of the latching circuits for the knife block, mold disc and magazine control circuits. However, since conductor D is marked at this time, only the mold disc control circuitry will register the request for movement of the mold disc to position 1. A signal on conductor N0 effects reset of the selector circuitry for the mold disc control circuitry after the appropriate latching circuit is operated.

As the tape advances, and contacts CS0–CS5 sense the signals for the character M, matrix M marks output conductors $\bar{0}$, $\bar{1}$, $\bar{2}$, 3, 4, 5 and conductor "MC" which extends to the magazine control circuitry MG (FIG. 19) is energized. As the digit on the tape immediately after the signal "M" on the tape is sensed by fingers CS0–CS5 (digit 1 in the present example) the conductor N1 is marked and a signal is transmitted to the latching circuits for the knife block, mold disc and magazine control circuits. Since the magazine control conductor MC is marked at this time, only the magazine control circuit MG will mark its register to indicate that magazine 1 is to be operated to the effective or operated position. The conductor N0 is also marked by the matrix M to reset the enabling circuitry after the appropriate latching circuit is enabled.

As the elevate signal EL at the end of the command signals is received, the elevate switch is closed and the machine runs through a dry cycle during which the knife block control circuitry effects adjustment of the knife to the position indicated by the digit registered.

After the dry cycle is completed, and as the knife has been adjusted to the desired position (or if the knife was in such position), the knife block control circuitry transmits a signal over an interconnecting sequencing conductor to the mold disc control circuitry which responsively effects adjustment of the mold disc to the position indicated by mold disc register circuits (digit 1 in the present example). If a change of position is required, the mold disc control circuitry moves the mold disc to the requested position. If the mold disc is in the requested position, or at such time as the requested position is reached, the mold disc control circuitry will enable the magazine control circuitry MG to effect a major shift, if such shift has been requested.

Digressing briefly, shifting of the four magazines each of which carries a different set of matrices, are divided into major shifts and minor shifts. That is, in the first position, magazines 1 and 2 will be arranged for selective use in a typesetting operation, and in a second position the magazines 3 and 4 are arranged for selective use in a typesetting operation. If magazines 1 and 2 are in position, and it is necessary to bring the magazines 3 and 4 into position such shift of the two pairs of magazines is identified as a major shift, and can be effected only after the knife and mold disc settings have been satisfied.

However, in the event that the magazines 1 and 2 are in position and matrices are being selected from magazine 2 and the request is for matrices from magazine 1, the shift from magazine 2 to magazine 1 is identified as a minor shift, and such shift can be made immediately at the time of the readout of the magazine information into the magazine control circuitry MG. That is, the minor shift will be made without waiting for a signal from the mold disc circuitry MD indicating that the knife block and mold disc have been set to the requested positions. The manner in which the various major and minor shifts are accomplished will be described in more detail hereinafter.

MAGAZINE CONTROL CIRCUITRY

Figure 19:
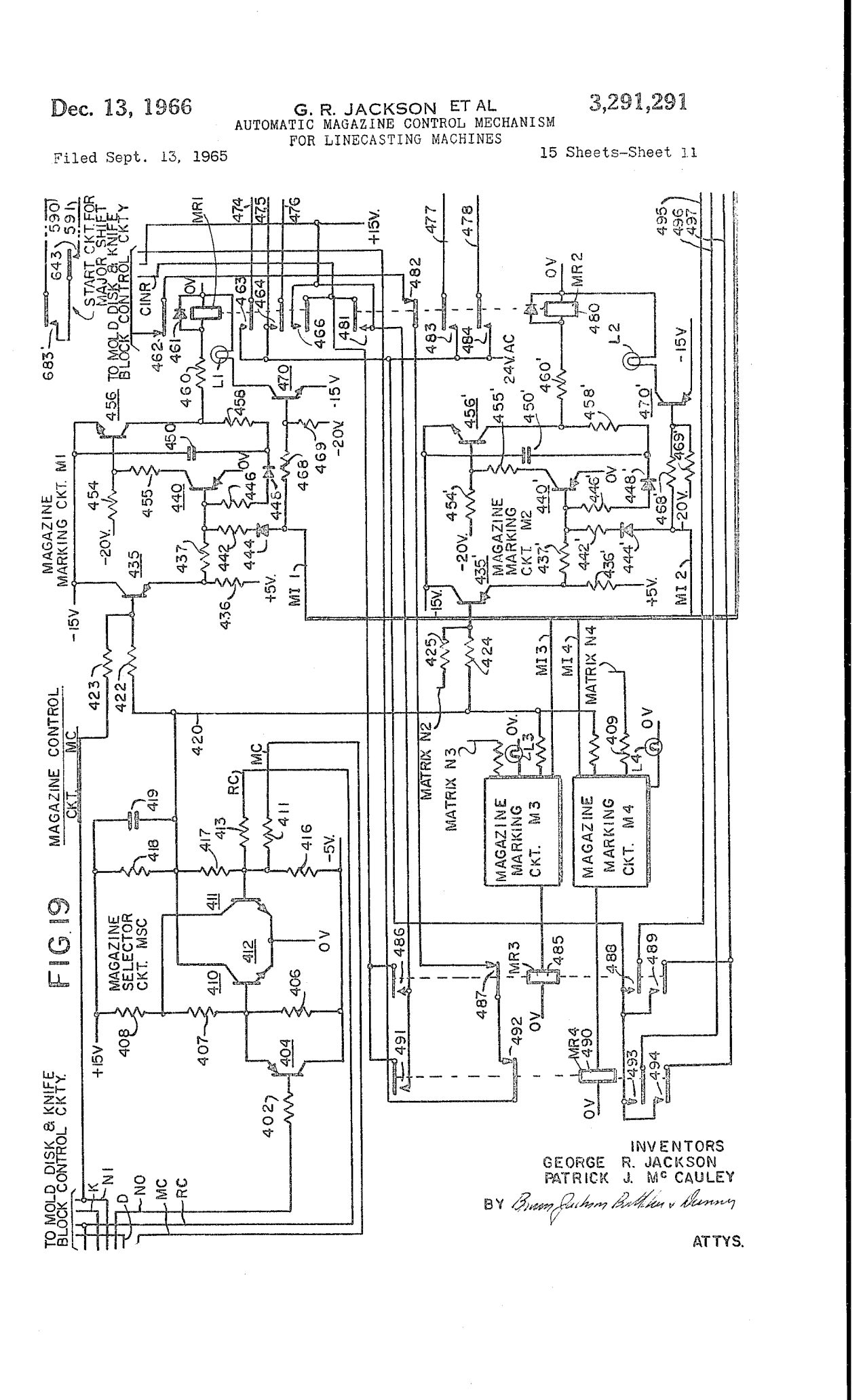

The magazine control circuitry MG which is responsive to the signals output from matrix M (FIGURE 18) is shown in detail in FIGURES 19 and 20. As there shown, the magazine control circuitry MG basically comprises a magazine selector circuit MSC and four magazine marking or latching circuits M1–M4 (FIG. 19) which selectively enable a set of control relays CR (FIG. 20) to control the shifting of the magazines. As will become apparent, if the linecasting machine includes more than four magazines, a correspondingly increased number of magazine marking circuits M1–M4 will be required.

The magazine selector circuit MSC (FIG. 19) is basically controlled by signals transmitted over conductor MC and N0 by matrix M (FIG. 18), and the signals on system reset conductor RC. As noted above, the reset conductor RC which normally prevents response of the various control circuits to the matrix output, has its inhibit voltage removed as the linecasting machine is initially operated to the command position. The output signals from magazine selector circuit MSC are transmitted over enabling conductor 420 which is connected to one input on each of the magazine marking circuits M1–M4.

The magazine selector circuit MSC basically comprises a flip-flop circuit 410 which operates to provide an enabling signal over enabling conductor 420 to the magazine marking circuits M1–M4 only in response to the marking of input conductors MC (and N0) by matrix M to indicate that a magazine control is desired. A reset transistor 404, as will be shown, resets the flip-flop as soon as the digit immediately following the letter "M" is fed by the matrix "M" to the appropriate one of the magazine register circuits M1–M4. That is, as indicated above, only the one of the magazine marking circuits M1–M4 associated with the particular digit which is received after the letter M on the control tape is enabled by the magazine selector circuit MSC. Assuming, for example, that the marking on the tape is M1, as the letter M advances beneath the readout apparatus, the matrix M will transmit a signal over conductor MC to the magazine selector circuit MSC which responsively marks enabling conductor 420 with energizing potential. As the digit 1 which appears thereafter on the tape is read out, a signal is extended by the matrix M over conductor N1 to the input circuit for marking circuit M1 and the first magazine marking circuit M1 will be enabled.

Each marking circuit, such as marking circuit M1, basically includes three transistors, such as 435, 440, 456 which operate and latch to mark the receipt of a signal over its associated input conductors, such as N1, whenever signals are received simultaneously over its two input circuits (i.e., inpus N1 and 420 for marking circuit M1) from the matrix M and magazine selector circuit MSC respectively. Each latching circuit, such as M1, additionally includes an individual function relay, such as MR1, which is operated whenever its associated marking circuit is enabled. Such relay is held operated until the indicated magazine is adjusted to the operating position. Thus in the case of the marking relay MR1, the marking circuit M1 is held enabled until the equipment is adjusted to select matrices from magazine M1. At such time, a signal is provided by the control circuitry over an associated indicating circuit MI1 and the marking circuit M1 is unlatched. Additionally an indicating lamp L1 is energized to indicate that matrices are being selected from magazine 1.

If only a minor shift is required, control relays CR operate to effect such shift as soon as the selected function relay, such as MR1, is operated. However, if a major shift is required, the control relays CR respond to the enabled one of the latching circuits in the magazine control circuit MG only after the mold disc circuit and the knife block circuits have effected the desired control of the mold disc and knife block. During the period of mold disc and knife block adjustment the tape advance is stopped by a marking signal placed on inhibit conductor CINR, first by the knife block circuit, and then by the mold disc circuit. During the magazine shift the conductor is energized by the energized one of the function relays MR1–MR4.

At such time as the circuits have completed setting of the mold disc and knife block to the requested positions, contacts 683', 643 (FIG. 19) will close (see the above identified copending application, Serial No. 459,792), and the control relays CR will operate automatically to adjust the magazines and associated equipment so that the matrices are selected from magazine 1. It is, of course, apparent that although contacts 683' and 643 are connected to be operated by sequencing switches in the mold disc circuitry, any other equipment, including direct control by the function relays MR1–MR4 or a simple simple manual switch, could be used to complete the start circuit for the magazine control circuitry MG. The control relays CR and their interconnection with the linecasting machine apparatus are now described briefly.

With reference to FIGURE 1, it will be recalled that an upper and lower limit switch ULS, LLS respectively have been mounted on the linecasting machine, the upper limit switch ULS being located to operate whenever the magazines 1–4 are moved to the lowermost extent of their travel, and the lower limit switch LLS being located to operate when the magazines are moved to the uppermost extent of their travel (the position shown in FIGURE 1). It will be seen from the showing of FIG. 1 that either the first pair of magazines 1 and 2 will be positioned for selective use, or alternatively, the second pair of magazines 3 and 4 will be positioned for selective use. The upper magazine of each pair (i.e., magazines 1 and 3) is referred to as the upper channels of a pair and the lower magazine of each pair (i.e., 2 and 4) is referred to as the lower channel of a magazine pair.

With reference now to FIGURE 20, the upper and lower limit switches ULS, LLS respectively, control an upper limit relay 530 and a lower limit relay 540, which relays at their contacts are operative at any given time, as will be shown, to indicate to the control circuitry the position of the magazines, and particularly which pair of magazines is in position for selective use at any time. If a minor shift is indicated by the position of relays 530, 540, a pair of upper and lower channel relays 520, 525 in association with rotary solenoids 242, 241 (FIG. 9) move the keyrods (or reeds) to the front or rear position to effect the shift required to select the matrices from the desired magazine of the pair of magazines in the operating position.

However, if matrices are being selected from the magazines of one pair and the request is for the selection of matrices from a magazine of the other pair, the portion of the relays 530, 540 is such to indicate that a major shift is required, and a circuit will be completed to the control valve relay 515 which in turn controls a plurality of electromagnetically controlled valves including a master valve MV (513) and clutch valve CV (514) in the provision of hydraulic power for the operating clutch. In addition, if a major shift is required, relays 530, 540 prepare enabling circuits for upper and lower magazine relays 505, 510, each of which respectively controls upper magazine valve 503 and lower magazine valve 500 to control hydraulic ram 160 (in the manner of lever 130) to adjust the directional controls for the magazine shift motor so that the magazines will be moved in the proper direction. Details of the motor control circuit can be found in Intertype Bulletin S–96 published by the Intertype Co., Brooklyn, New York.

Briefly, during a major shift, as the valves 513, 514 are energized, the hydraulic ram 55 initiates the cycle which effects operation of the clutch through 180° of a 360° cycle and the opening of the channel entrance mechanism CEM as described hereinbefore. Once the channel entrance is open, an electric motor contractor 185 (FIG. 20) for the electric motor is energized to effect power shifting of the desired pair of magazines to the operating position. This, of course, requires the energization of the motor to rotate in the proper direction and the relays 505, 510 and valves 500, 503 operate to make such selection.

The time of operation of motor contactor 185 is controlled by open channel relay 550 and by motor control relay 560. Thus, as the hydraulic equipment is operated to initiate opening of the channel entrance mechanism CEM, an associated open channel switch OCS is operated to energize open channel relay 550 which restored the control valve relay 515 and in turn prepared the control valve relay 515 for operation again to close the channel entrance mechanism CEM after a major shift is completed.

A distributor relay 570 at its contacts 571 is operative to interrupt both the start circuit for the motor control relay and also the major shift start circuit whenever a matrix is in the distributor. The operation of the motor control relay 560 occurs as the channel entrance mechanism approaches the open position (i.e., near the end of the first 180° of the clutch cycle), normally open mechanism switch 586 closes and motor control relay 560 at contacts 561 completes a circuit for motor contactor 185. A safety switch 565 (FSS) mechanically controlled by a matrix detector plunger 208 and safety lever plunger 209 prevents operation whenever the conditions noted earlier occur.

After the motor has been energized and a major shift has been made, switch means (not shown) interrupts the motor circuit. Further, as a result of the shift the position of the upper and lower limit switch 542, 543 reverses and the start circuit for the clutch valve relay 515 is once more completed. As the clutch moves the equipment through the initial segment of the 180°–360° portion of its cycle, switch 586 opens to restore the circuit for motor control relay 560 and control valve relay 515. Near the end of the clutch cycle, relay 550 enables channel relays 520, 525 to effect a minor shift if necessary.

A set of indicating circuits MI1–MI4 controlled by relays 530, 540, 550 and mechanical switches 250, 252 provide marking and reset to the marking circuits MR1–MR4. At such time as a major shift is initiated, the power is removed from indicating conductors MI1–MI4 by the open channel relay 550. As the desired magazine pair is moved into position, and the equipment adjusted to select the matrices from the desired magazine of the pair, relays 530, 540, 550, and switches 250, 252 effect the marking of a corresponding one of the conductors MI1–MI4 to reset the enabled one of the marking circuits M,–M4. Additionally the light L1–L4 associated with the marking circuit M1–M4 for the magazine from which the matrices are being selected will now be energized. By way of example, if magazine 1 was in position and magazine 2 has been moved into position, lamp L1 will have been extinguished as potential was removed from conductor MI1, and lamp L2 will be energized by the potential now connected over conductor MI2.

The specific manner in which the magazine control circuitry is operative to control the machine apparatus in effecting a minor shift and a major shift will now be set forth in detail.

*Magazine minor shift*

As described above, a minor shift of magazine consists of shifting the selection of matrices from one magazine of a pair to the other magazine of the same pair. In the example to be described, it will be assumed that matrices are being selected for magazine 1 and that a minor shift to magazine 2 is requested. Other minor shifts include a shift from magazine 2 to magazine 1. If magazines 3 and 4 are in operating position, then a shift from magazine 3 to magazine 4 is a minor shift, and from magazine 4 to magazine 3 is a minor shift.

Figure 18:
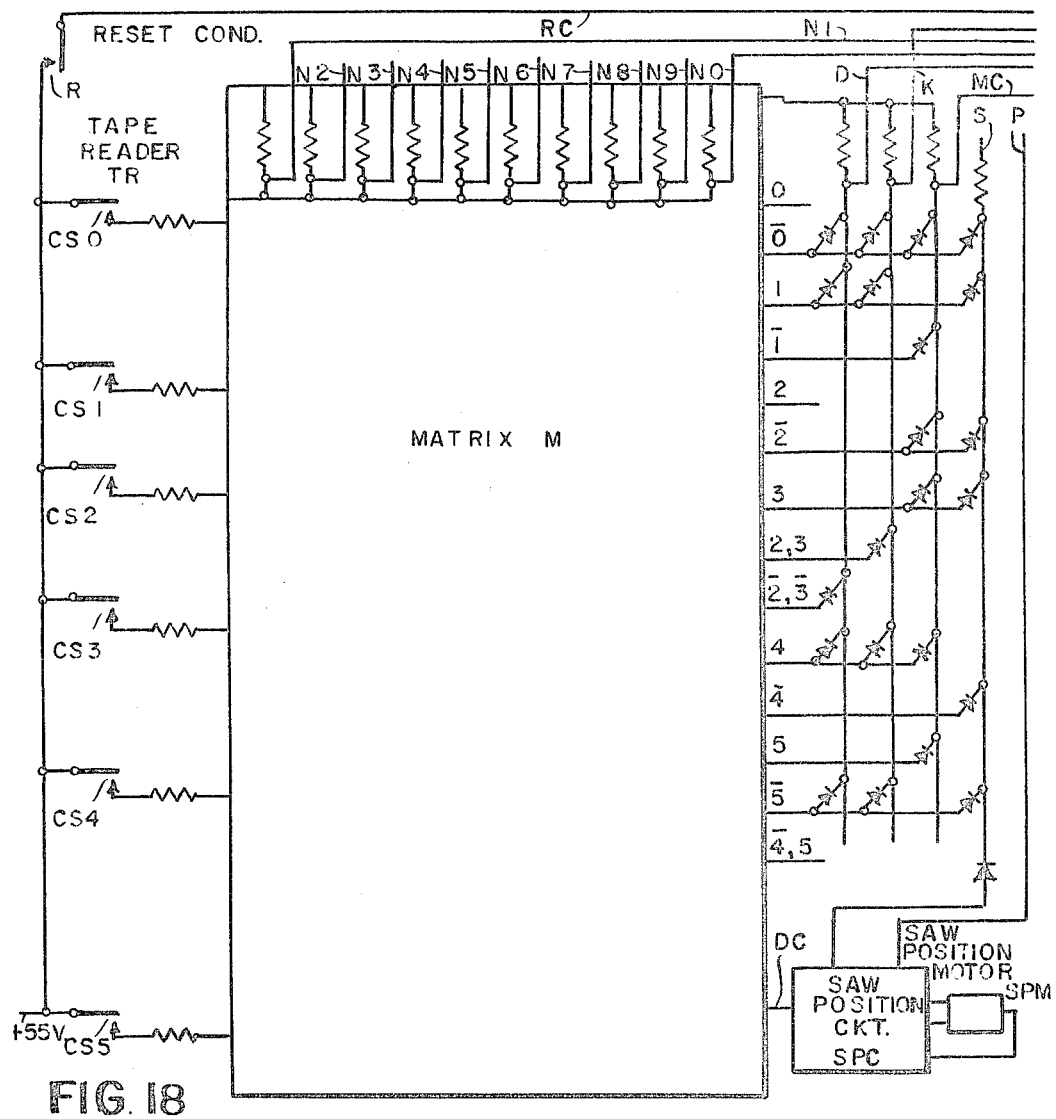
FIGURE 18 is a schematic showing of the tape reader and matrix for providing signals to the control circuitry in response to the coded information on the tape.

In any magazine shift, major or minor, the tape information requesting the shift is supplied to the matrix M as described above which in turn marks conductor MC, conductor N0 and the one of the digit conductors N1–N4 which corresponds to the magazine to be selected. With reference to FIGURE 18, marking conductors N1–N4 output from matrix M are connected to the inputs of the magazine latching circuits M1–M4 and, as indicated in the copending application, are also connected to the mold disc and knife block latching circuitry. However, at the time of readout of signal M1 only matrix conductor MC is marked, and the markings on the conductors N1–N4 are effective only in the magazine marking circuits M1–M4 (FIGURE 19) as will now be shown.

*(a) Magazine selector circuit*

With reference to FIGURE 19, magazine selector circuit MSC which enables the magazine latching circuits M1–M4 is connected to the system reset conductor RC (conductor 503 in the copending application). As further noted therein, contacts R are closed during normal linecasting operation of the machine, and positive potential (+55 volts) is normally extended over the reset conductor RC by the control circuitry, whereby operation of the magazine selector circuit MSC is normally inhibited. Immediately after the receipt of the signals UR, UR and the blocking of the typesetting unit in response thereto, (i.e., operation of the linecasting machine to the command position) the linecasting machine reset contacts R are opened, and positive potential is removed from the reset conductor RC to permit response by the magazine selector circuit MSC to any signals received over the matrix conductor MC from the matrix M. With sensing of the letter M (perforations 3, 4, 5 on tape T—FIGURE 17) by contacts CS0–CS5, matrix M is energized to provide a marking signal over conductor MC in the manner set forth in the copending application, Serial No. 459,792 which in turn extends a conditioning signal over conductors 420 to one input of each of the magazine marking circuits M1–M4. As the tape advances and the digit 1 is read out by the contacts CS0–CS5, the matrix M is operative to provide a marking signal over conductor N1 which is connected to a second input circuit for the magazine marking circuit M1. Simultaneously, with readout of the digit 1, matrix M also provides an energizing signal over conductor N0 to transistor 404 in the magazine selector circuit MSC to reset the selector circuit. The structure of the magazine selector circuit and its mode of operation is now set forth in detail.

As shown in FIGURE 19, the selector circuit MSC for the magazine control circuit MG basically comprises a flip-flop circuit 410 including transistors 412, 414. Transistor 414 may be of the type 2N1302 which includes a collector element connected over resistor 408 to +15 volt potential and over resistor 407 to the base of transistor 412; an emitter element connected to zero volt potential, and a base element connected to the junction of resistors 416, 417 in the voltage divider including resistors 416, 417, 418 which divider is connected between +15 volt and −5 volt potential. The base of transistor 414 is further connected over resistor 413 to the system reset conductor RC, and over resistor 411 to the magazine marking conductor MC which extends from matrix M.

The second transistor 412 in the flip-flop 410, may be of the type commercially available as a 2N1302 which includes an emitter element connected common with the emitter of transistor 414 to zero potential, a base element which is connected to the junction of resistors 406, 407 in a voltage divider 406, 407, 408 which is connected between +15 and −5 volt potential, and a collector element which is connected (a) over resistor 418 to +15 volts, (b) over resistor 417 to the base of transistor 414, and (c) over control conductor 420 to each of the magazine marking circuits M1–M4. The reset transistor 404 for flip-flop circuit 410 may be of the type commercially available as a 2N1303 type, and includes an emitter connected to the base of transistor 412, a base connected over resistor 402 to the N0 conductor of the matrix M, and a collector connected to −5 volt potential.

With the command system in a reset condition (i.e., the linecasting machine effecting its normal linecasting operation) +55 volt potential is applied over contacts R (FIG. 18) and the reset conductor RC and resistor 413 to the base element of the transistor 414 turns on transistor 414. With transistor 414 conducting, the more negative potential at the base of transistor 412 results in transistor 412 being normally turned off. A positive potential which appears at the collector thereof is transmitted to one input circuit for each of the marking circuits M1–M4. As will be shown, with the one input circuit of each marking circuit M1–M4 biased in such manner, any signals which may be placed on the conductors N1–N4 by the matrix M will be without effect.

The magazine selector circuit MSC remains in such condition during linecasting operations, and is only operative when the control system is operated to the command condition, and a letter "M" appears in the tape while the system is in such condition. Briefly, at such time as the tape advances to place the equipment in the command position (UR, UR . . .) contacts R are opened and positive potential is removed from the reset conductor RC and the base of transistor 414 in flip-flop 410 to prepare the selector circuit for operation. As the tape advances and readout of letter M is effected, the matrix M places a negative signal on conductor MC to set the flip-flop 410 (transistor 414 off, trnsistor 412 on), and the potential at the collector of transistor 412 (and conductor 420) goes to zero volts, whereby a negative signal which is applied to any one of the second input circuits to marking circuits M1–M4 over matrix conductors N1–N4, while the marking circuits are thus prepared over conductor 420 by magazine selector circuit MSC, will be effective to enable the corresponding one of the marking circuits M1–M4.

At such time as a marking occurs on one of the conductors N1–N4, a negative signal is also applied to conductor N0 by the matrix M, and the resultant negative signal is applied over transistor 404 to the base of transistor 412 to turn off transistor 412 and thereby shift the flip-flop back to its original state (transistor 414 on, transistor 412 off).

Summarily, magazine selector circuit in response to readout of the letter M momentarily prepares the four marking circuits M1–M4 for operation, and as the digit on the tape which appears after the letter M is read out, both inputs to a corresponding one of the marking circuits M1–M4 are energized. As will be shown, the energized marking circuit will operate to mark the magazine position requested, and will remain operated until the equipment is adjusted to select the matrices from the indicated magazine.

*Magazine marking circuits M1–M4*

As indicated above, each of the magazine marking circuits, such as M1, controls movement of a correspondingly different one of the magazines 1–4 to the effective operating position. Briefly, enablement of magazine marking circuit M1 will result in the operation of the system to move the magazines M1 and M2 to the operating position indicated in FIGURE 1, and additionally shifting of the keyrods (or reeds) 240 to their forward position, so that the keyrods 240 as operated will assemble matrices from magazine 1. Magazine marking circuit M2, as energized, will result in movement of the magazines 1 and 2 to the position shown in FIGURE 1, and further effects shifting of the keyrods 240 to the rearward position so that matrices will be assembled from magazine 2. Enablement of magazine marking circuit M3 will result in movement of the magazines 3 and 4 to the operating position, (i.e., the position of magazines 1 and 2 in FIGURE 1) and additionally movement of the keyrods 240 to the forward position, whereby the matrices will be assembled from magazine 3, and magazine marking circuit M4 as energized will result in the movement of the magazines 3 and 4 to the operating position, and additionally movement of the keyrods 240 to the rearward position so that the matrices will be assembled from magazine 4. Although the magazine selector circuit effects marking of the circuits M1–M4 at the time of readout of the magazine information on the tape, only a minor shift of the magazines occurs immediately. As will be shown, a major shift is programmed to occur after the knife block and mold disc adjustments are made.

Each of the magazine marking circuits M1–M4 are similarly constituted, and accordingly only one of the circuits is described in detail hereat. With specific reference to FIGURE 19, the magazine marking circuit M1 as there shown basically comprises a first input circuit including resistor 423 connected to the matrix conductor N1, and a second input circuit including resistor 422 connected to the enabling conductor 420 from the magazine selector circuit MSC. The input circuit for magazine marking circuit M2 will be connected to matrix conductor N2 and enabling conductor 420; the input circuit for magazine marking circuit M3 will be connected to matrix conductor N3 and enabling conductor 420; and the input circuit for magazine marking circuit M4 will be connected to matrix conductor N4 and enabling conductor 420.

Each of the magazine marking circuits, such as M1, further includes a first transistor 435, and a pair of switching transistors 440, 456. Transistor 435, may be of the type commercially available as a 2N1303, which includes a base connected to the two input circuits for the magazine circuit M1, a collector connected a −15 volts, and an emitter connected over resistor 436 to +5 volts, and over resistor 437 to the input circuit for the first switching transistor 440 of the pair 440, 456. In the absence of an enabling signal from the magazine selector circuit MSC over conductor 420, the positive signal on conductor 420 as extended over emitter follower 435 and resistor 437 to the base element of switching transistor 440 maintains transistor 440 turned off. With the setting of flip-flop 410 and removal of the positive signal from conductor 420 responsive to readout of letter M on the tape, and the receipt of a negative signal over conductor N1 from the matrix as the result of readout of the digit 1, a negative potential is applied over transistor 435 to the base of transistor 440 to effect registration of the request for movement of magazine 1 to the operating position as will now be shown.

Transistor 440 may be of the type commercially available as a 2N1303 which includes an emitter element connected to zero volt potential, a base element connected to the output of transistor 435, and also over resistor 446 and diode 448 to the output of the second switching transistor 456 as will be described, and additionally over resistor 442 and diode 444, and conductor MI1 to an indicating and reset circuit in the control circuitry (FIGURE 20). As will be shown in more detail whenever matrices are being selected from the magazine associated with a magazine circuit, a signal will be applied over its associated indicating conductor, such as MI1 to energize an associated transistor 470 and lamp L1.

The second transitsor 456 of the switching pair 440, 456 is controlled by first transistor 440 and may be of the type commercially available as a 2N1302. Transistor 456 includes a base element connected to the junction of resistors 454, 455 (which are connected between the collector of transistor 440 and −20 volts), an emitter connected to −15 volt potential, and a collector connected over resistor 458, diode 448 and resistor 446 to the base of the first switching transistor 440 to provide a latching circuit for the switching pair. The collector of transistor 456 is also connected over resistor 460 to the magazine relay MR1 and zero potential. A diode 461 is connected in parallel with marking relay MR1.

As indicated above, in the absence of an enabling signal from the magazine selector circuit MSC indicating that the letter M has been read out from the tape, the positive potential over transistor 435 maintains transistor 440 turned off, and the negative potential which occurs at the collector thereof is coupled to the base of transistor 456 to maintain same turned off. As a result the magazine relay MR1 will be in the restored position.

A brief study of FIGURE 19 will show that each of the other marking circiuts M2–M4 which are of the same arrangement, are connected to control operation of correspondingly different magazine relays MR2–MR4. Likewise correspondingly different indicating conductors M12–M14 feedback signals to the different circuits M2–M4 whenever the corresponding magazine is in position.

The four magazine function relays MR1–MR4 have associated contacts which are connected to effect correspondingly different control operations. Briefly, magazine relay MR1 at its contacts 462 is connected in series with a like contact (482, 487, 492) on each of the other magazine relays MR2–MR4, to extend negative 5 volt potential source as explained in the copending application Serial No. 459,792 to a squencing circuit in the mold disc circuitry. With operation of any one of the magazine relays MR1–MR4 the series circuit is interrupted and —5 volt potential is removed from the sequencing circuit in the mold disc control circuitry, whereby the associated sequencing switching device in such circuit is marked to indicate that a magazine control function is to be effected at its proper time in the sequence. Although such arrangement is described herein for purposes of continuity of description, it is readily apparent that if the magazine control circuit were not being used in conjunction with a linecasting machine having these other automatic control functions, such circuit would be used as a start circuit to the control relays CR in lieu of the start circuit from the mold disc circuit to be described.

Magazine control relay MR1 also includes a second set of contacts 463 which close to indicate to the control relays CR that the upper magazine pair (magazines 1 and 2) are to be moved into the operating position, a third set of contacts 464 which close to indicate to the equipment that the upper channel magazine (magazine 1) of the upper magazine pair is to be placed in the operating position, and a fourth pair of contacts 466 which connect power to the CINR conductor which energizes the inhibit relay (not shown) for maintaining the tape advance equipment inoperative. As described in the copending application during the periods in which the knife block and mold disc operation are being effected, a signal is placed on the CINR conductor by the knife block circuitry, and thereafter the mold disc circuitry energizes the inhibit relay over the same conductor to prevent advance of the tape during the period in which automatic adjustment of the mold disc apparatus is being effected. The magazine circuit likewise is operative to apply +15 volt potential to the inhibit lead CINR to retain the tape in the stopped position until such time as the desired magazine setting is obtained. The manner in which such signal would be used to halt advance of the tape independent of the mold disc and knife block circuitry (absent such equipment) is, of course, apparent.

Magazine relay MR2 for the second magazine marking circuit M2, as operated, is effective at its contacts 481 to mark the hold conductor CINR for the inhibit relay to prevent advancement of the tape while the request is registered, at its contacts 482 interrupts the series circuit to the sequence circuit in the mold disc control, at its contacts 484 registers a request for movement of the first pair of magazines MR1, MR2 to the operative position, at its contacts 483 registers a request for movement of the keyrods 240 to the rearward position to thereby effect selection of the matrices from magazine 2.

Magazine relay MR3 associated with the third magazine marking circuit M3 is operative at its contacts 486 to connect enabling potential to conductor CINR to maintain the inhibit relay operated and thereby maintain the tape advance mechanism inoperative; at its contacts 487 interrupts the series circuit to thereby mark the sequencing equipment in the mold disc circuitry that a magazine control is desired; at its contacts 489 is effective to mark conductor 497 to indicate that the pair of magazines 3 and 4 should be moved to the operative position, and at its contacts 488 marks conductor 495 to indicate to the control relays CR that the keyrods 240 should be adjusted to select the matrices from magazine 3.

Magazine relay MR4 associated with magazine marking circuit M4 is operative at its contacts 491 to maintain the inhibit relay energized and thereby prohibit operation of the tape advancement mechanism, at its contacts 492 is operative to provide a signal to the sequencing circuitry in the mold disc circuitry that a magazine control is required; at its contacts 494 provides a marking signal over conductor 497 to indicate to the control relays CR that the second pair of magazines 3 and 4 are to be moved to the operative position, and at its contacts 493 provides an energizing potential over conductor 496 to indicate to the control relays CR that the keyrods 240 should be adjusted to effect selection of the matrices from magazine 4.

The manner in which the control relays CR (FIGURE 20) are operative in response to the energization of the function relays, such as MR1, to move the desired pair of magazines to the operative position, and to adjust the equipment to effect selection of the matrices from the desired magazine of the pair is now set forth in detail.

*Magazine 1—In operating position*

It will first be assumed for purposes of explanation that the magazines in the linecasting machine are in the position shown in FIGURE 1, i.e., the upper magazines 1 and 2 in the operating position with the keyrods 240 operated so that the matrices are being selected from magazine 1. With the equipment in such position, the upper limit switch ULS (FIGURE 20) will be closed, whereby an operating circuit is completed for the upper limit relay 530, the circuit extending from 24 volt A.C. potential (FIG. 19) over conductor 475, upper limit switch ULS, and the winding of upper liimt relay 530 to ground. With upper limit relay 530 energized, contacts 535 are open to indicate to the upper magazine relays 505, 510 that the upper pair of magazines (1 and 2) are in the operated position. As a result, if a signal is received from magazine circuit M1 or M2 over conductor 474, whenever the magazines 1 and 2 are in the operated position, the upper magazine relay 505 will not have to be operated and contacts 535 being open so indicate in the control circuit.

Upper limit relay 530 at its contacts 532 prepares a request to the upper channel relay 520 if magazine circuit M1 is enabled at this time and at its contacts 534 prepares a request to the lower channel relay 525 if magazine circuit M2 is enabled at this time.

Upper limit relay 530 at its contacts 537 completes a point in the indicator circuit for the first and second magazine circuits 1 and 2. Assuming that the matrices are being selected from magazine 1, the reed frame will be in the front position (FIG. 9) and contacts 250A (FIG. 20) on switch 250 will be closed, whereby a circuit will be completed for lamp L1 (FIG. 19), such circuit extending from ground (FIG. 20) over contacts 557, 537, 250A, conductor MI1 and resistor 468 to transistor 470 which is switched on to complete an obvious energizing circuit for lamp L1 associated with the first magazine. Lamp L1 as illuminated indicates to the attendant that the equipment is in position to select matrices from magazine 1.

*Minor shift*

It will be assumed now for purposes of explanation that a minor shift of the magazines is desired, and specifically that matrices are being selected from magazine 1, and that the next matrices are to be selected from magazine 2. In effecting a minor shift of this type (i.e., between a pair of magazines in the operative position) it is only necessary for the operator to provide the signals UR, UR, M2, LR on the tape, the equipment being operative in response thereto to effect adjustment of the equipment to select the matrices from magazine 2 without requiring shifting of the magazine pair, or adjustment of the knife block mold disc or saw equipment.

More specifically, as the information representing the minor shift is advanced to readout, and specifically, as characters UR, UR are sensed, the machine is shifted to the command position in the manner described in the copending application, and the reset relay is operated to open contacts R (FIG. 18) to thereby remove +55 volt potential from the RC conductor. As noted above, as the positive potential is removed from conductor RC the flip-flop circuit 410 (FIG. 11) in the magazine selector circuit (FIG. 19) MSC is prepared for operation. As the letter M is moved into the tape readout position, matrix M (FIG. 19) provides an energizing signal over conductor MC to input circuit for magazine selector circuit MCS, and flip-flop 410 in the magazine selector circuit MC is set. The resultant zero volt signal applied by transistor 412 over conductor 420 prepares each of the magazine marking circuits M1–M4 for a register operation. As the tape now advances to move the digit 2 into readout position (it being recalled that the matrices are presently selected from magazine 1 and the tape has been marked to request selection of the matrix from magazine 2) the matrix M will apply a signal over conductor N2 and resistor 425 to the magazine marking circuit M2 which in turn operates magazine control relay MR2. That is, transistor 435' in the magazine marking circuit M2 operates as an emitter-follower to extend the negative potential signal received over conductor N2 to the base of transistor 440' which turns on, and the resultant zero volt signal which appears at the collector of transistor 440' reduces the negative voltage at the base of transistor 456' which turns on to complete an operating circuit for the function relay MR2 (i.e., −15 v., transistor 456', resistor 460' and relay MR2 to zero volt potential). Simultaneously, the transistor 456' completes a holding circuit for the transistor 440' which extends from −15 volt potential over the transistor 456', resistor 458', diode 448' and resistor 446' to the base of the first switching transistor 440' to maintain the switching pair 440', 456' turned on subsequent to the removal of the input signals on conductors N2 and 420.

Magazine relay MR2 operates and at its contacts 481 connects +15 volt potential to the inhibit relay conductor CINR for the inhibit relay (not shown) which operates to disable the tape-advancing mechanism and thereby halt the tape advance; at its contacts 482 interrupts a point in the marking circuit for the sequence equipment in the mold disc circuit which is without effect at this time; at its contacts 483 connects 24 volt A.C. potential to conductor 477 to indicate to the control relays that matrices are to be selected from the lower channel magazine of the upper pair of magazines, and at its contacts 484 places 24 volt A.C. potential on conductor 478 to indicate to the control relays that the upper magazine pair (magazines 1 and 2) should be in the operating position.

More specifically, since the magazines 1 and 2 have been assumed to be in the operated position, the upper limit relay 530 is operated, and the closure of contacts 484 to place the marking potential over contacts 484 and conductor 478 to the control relays CR is without effect by reason of the open contacts 535 on the upper limit relay 530. Additionally, contacts 531, 533 are maintained open to prevent completion of the start circuit (conductors 591, 590) which is necessary for a major shift (i.e. this would be necessary only if the lower magazines 3 and 4 are to be moved into position). However, since the matrices are being selected from the upper channel (magazine 1) of the upper pair, and the matrices are to be selected from the lower channel (magazine 2) of the upper pair (as indicated by the operated condition of magazine control relay MR2), only a minor shift is required and operating potential is extended by closed contacts 483 over conductor 477 and contacts 534 to the lower channel relay 525, and over contacts 553 to ground to thereby effect energization of lower channel relay 525.

Lower channel relay 525 operates, and at its contacts 524 completes an operating circuit for the front solenoid 241 (FIG. 9) which energizes to move the keyrods 240 from the front position to the rear position in a manner described hereinabove. As the keyrods are thus moved, switch actuator 250 (FIG. 9) operates, and the switch contacts 250A (FIG. 21) is opened, and contacts 250B are closed to complete an energizing circuit over conductor MI2 to the magazine marking circuit M2 to indicate to the magazine circuit M2 that the keyrods will now select matrices from magazine 2. Such marking circuit extends from ground over contacts 557, contacts 537, 250B, conductor MI2 and resistor 468' to the base of transistor 470' which turns on to complete an obvious energizing circuit for lamp L2. The opening of switch contacts 250A with the operation of the keyrods in such manner interrupts the potential previously connected to conductor MI1 whereby the lamp L1 associated with magazine marking circuit M1 is extinguished.

The ground marking signal (+55 volts in the present circuitry) which was extended over conductor MI2 to the magazine marking circuit M2 to energize lamp L2 is also applied over diode 444' (FIG. 19), resistor 442' to the base of transistor 440'. Transistor 440' turns off with receipt of the positive potential signal, and the resultant negative signal at its collector turns off transistor 456', to interrupt the energizing circuit for the magazine relay MR2.

As magazine function relay MR2 restores, it is effective at its contacts 481 to remove the energizing potential from CINR conductor whereby the inhibit relay restores to permit further tape advancement, and at its contacts 483, removes the marking potential from conductors 477, to restore lower channel relay 525. The keyrods are mechanically latched as moved to a position, and accordingly the position of the keyrods 240 will not change with the restoration of the lower channel 525 and deenergization of rotary solenoid 241. The matrices will therefore continue to be selected from magazine 2.

It is apparent from the foregoing description that information may be placed on the tape to effect a magazine control without necessarily requiring operation of the mold disc, knife block, or saw setting equipment which may be a part of the system. It is further apparent that a minor shift from magazine 2 to magazine 1 may be accomplished in a similar manner by punching UR, UR, MI, LR on the tape. The magazine circuit M1 in such case would energize the upper channel relay 520 to effect the ultimate energization of the rotary solenoid 242 and thereby the movement of the keyrods 240 to their forward position whereby matrices would be selected from the magazine 1. Switch 250 (FIG. 9) would close contacts 250A and marking potential on conductor MI1 would restore register circuit M1 to permit tape advancement, and illuminate lamp L1 to indicate to the attendant that matrices are being selected from magazine 1.

*Major shift—Magazine 2 to magazine 3*

As indicated above, in the event that matrices are to be selected from a magazine of a pair other than the pair of magazines in the operating position, a major shift of the magazines is required. That is, in the present example, if the upper magazines 1 and 2 are in the operating position, and the information on the tape indicates that the matrices are to be selected from either magazine 3 and 4, it will be necessary to move the first pair of magazines 1 and 2 from the operating position, and to place the magazines 3 and 4 in the operating position. The manner in which the control circuitry effects such operation will now be described in detail.

In the foregoing example in which a minor shift was described, the upper pair of magazines 1 and 2 were in position, and the manner of operation of the equipment to selectively obtain matrices from magazines 1 and 2 was set forth. It will now be assumed that the magazines 1 and 2 are still in the operating position, and that the tape information requests selection of matrices from magazine 3. A major shift is therefore necessary.

With reference to the tape in FIGURE 17, and assuming that the digit 3 appears after the letter M, as the tape advances to move the code letters UR, UR into sensing position, the equipment is shifted into the command position, and as the further code S14P03 is sensed by contacts CS0–CS5, the saw control equipment adjusts the saw to the 14 pica 03 point position. As the tape advances and the knife block, mold disc and magazine code signals K1, D1 and M1 respectively are successively sensed by contacts CS0–CS5 and fed into matrix M, conductors K, NI, NO; D, NI, NO and M, N3, NO are energized in order and such information is placed in the registers associated with the knife block (not shown), mold disc (not shown) and magazine control circuits respectively.

As the elevate signal is sensed at the end of command signals the elevate switch is closed, and the linecasting machine runs through a dry cycle during which the knife block-control circuitry effects adjustment of the knife to the position indicated by the digit registered. After the dry cycle is completed and as the knife has been adjusted to the desired position, the knife block control circuitry transmits a signal to the mold disc control circuitry which responsively effects adjustment of the mold disc to the position registered on the mold disc register circuits. If a change in position is required, the mold disc control circuitry operates the mold disc to the requested position. If the mold disc is in the request position, or at such time as the requested position is reached, the mold disc control circuitry will close contacts 683' and 643 to enable the magazine control circuitry to effect a major shift if such shift has been requested. The manner in which the knife block and mold disc circuitry are so operative is set forth in the copending applications having Serial No. 459,845 and Serial No. 459,792, respectively. If the magazine control circuitry is used without knife block and mold disc controls, it is apparent that the sequence circuit would not be required.

At the time of readout of the magazine information M3 on the tape, the magazine control relay MR3 (FIG. 19) for the third magazine will be operated, the operation thereof being effected in the manner set forth above relative to the operation of relays MR1, MR2. Magazine relay MR3 (485) at its contacts 486 places holding ground on the inhibit conductor CINR to maintain the inhibit relay operated, and thereby prevent advance of the tape during the magazine shift; at its contacts 487 opens a point in the series circuit to the mold disc control circuitry indicating that a magazine shift is required (as described in detail in copending application having Serial No. 459,792, which was filed May 28, 1965) and at its contacts 488 marks conductor 495 to indicate to the circuitry that the upper magazine of the pair is to be selected, and at its contacts 489 places marking potential on conductor 497 to indicate to the control circuitry that the lower magazine pair is to be placed into operating position (magazines 3 and 4).

With reference to FIGURE 21 whenever matrices are being selected from magazine 2, the upper limit relay 530 is energized and the lower limit relay 540 is deenergized. As a result a signal from either the marking circuit M3 or M4 over conductor 495, 496 requesting magazine 3 or 4 respectively is extended to the start circuit for the major shift. Digressing briefly, if the lower magazines 3 and 4 were in the operated position, the lower limit relay 540 would be operated, and contacts 541, 543 would be open to prevent energization of the major-shift start circuit. In such event, a signal over conductor 495 or 496 would initiate a minor shift over contacts 542, 544 by operating either upper channel relay 520 or lower channel relay 525 as the case may be.

In the present example in which a major shift is required, the magazine relay MR3 at its contacts 488, extends 24 volts A.C. over conductor 495, contacts 541, conductor 590 and contacts 683', 643 to the start circuit (conductor 591) which controls a major shift. As these contacts 683', 643 are closed subsequent to completion of the mold disc setting, the start circuit is further extended and completed over conductor 591, and the control valve relay 515, and contacts 555 and 571 to ground.

Control valve relay 515 operates and at its contacts 516 and 517 connects 115 volt A.C. potential to the control valve CV (514) and to master valve MV (513) preliminary to the accomplishment of a major shift wherein the upper magazine pair will be removed from the operating position, and the lower pair of magazines will be moved into the operating position.

Digressing briefly, it will be apparent that in the event matrices are in the distributor system at the time the start circuit for a major shift is completed, or in the event that the magazine is in the open channel condition, the circuit would have been interrupted by open contacts 571 on distributor relay 570, or alternatively by open contacts 555 on open channel relay 550. It is apparent therefore that as long as the matrices are being distributed, a magazine shift will not occur. Assuming that there were no matrices on the distributor bar, and that distributor relay 570 and the open channel relay 530 are restored, the master valve 513 and control valve 514 will be energized as described above when the major shift start circuit is completed over control valve relay CVR (515).

It will be recalled that the magazine relay MR2 in operating was also effective at its contacts 489 to place potential on conductor 497. Since the upper magazines are in position, the lower limit relay 540 is restored and contacts 545 extend such potential to the lower magazine relay 510 to indicate to the system that the lower magazines 3 and 4 are to be moved to the operating position.

Lower magazine relay 510 operates, and at its contacts 511 maintains a further circuit to the master valve 513, and at its contacts 512 completes an energizing circuit to the lower magazine valve LMV (500). The lower magazine valve 500 operates to adjust a set of direction control contactors (not shown) in the motor control circuit for the magazine shift motor (not shown) to effect the proper direction of rotation of the motor as energized. That is, as will be shown, when the motor is energized to move the lower magazines 3 and 4 into position its direction of rotation must be such that the magazines are moved upwardly, and in operations in which the lower magazines 3 and 4 are to be moved out of position, and the upper magazines 1 and 2 are to be moved into position, the direction of rotation will be in an opposite direction. Lower magazine valve 500 and upper magazine valve 503 control such selection.

As the master valve 513 operates, it is effective to control the flow of fluid to the hydraulic system, and as the control valve 514 operates, fluid is channeled to the channel entrance operating cylinder 55 to initiate opening of the channel entrance mechanism CEM by the clutch mechanism in a manner described hereinbefore.

As soon as the clutch effects the initial movement of the mechanism in the opening of the channel mechanism, open channel switch OCS (FIG. 1) closes to complete an operating circuit for the open channel relay 550, which circuit extends from ground over the winding of relay 550, open channel switch OCS, contacts, and conductor 475 to 24 volt A.C. potential.

As the open channel relay 550 operates, it is effective at its contacts 551 and 555 to interrupt the energizing circuit for control valve relay 515 which restores, and at its contacts 516, 517 interrupts the energizing circuit for control valve 514, and at its contacts 516 interrupts the energizing circuit for master valve 510, which is now maintained energized over closed contacts 511 on the lower magazine relay 510. The clutch mechanism as noted above continues its movement of the channel entrance mechanism until it moves through approximately 180° of its cycle (the channel entrance mechanism in the open position).

Open channel relay 550 at its contacts 552 and 554 prepares an enabling circuit for the control valve relay 515 (which as will be shown is once more completed subsequent to shifting of the magazines to the desired position); at its contacts 556 interrupts the marking potential for the magazine indicator circuits MI1–MI4 to thereby prevent the inadvertent reset of the marking circuits M1–M4 until such time as the requested shift is completed, and at its contacts 553 interrupts a point in the energizing circuits for the upper channel and lower channel relays 520, 525 to prevent shifting of the keyrods to the requested position until after such time as the requested major shift of the magazines has been completed.

As the clutch mechanism approaches 180° of its cycle, mechanical switch 586 closes to complete an energizing circuit for the magazine control relay 560, the circuit extending from 24 volt A.C. potential on conductor 475 over the winding of motor control relay 560, mechanical switch contacts 586 and delivery relay contacts 571 to ground.

Assuming that there are no matrices on the distributor bar, the distributor relay DR will be in its normal restored condition, whereby magazine control relay 560 operates, and at its contacts 561 completes an energizing circuit to the magazine shift motor contactor 185, the circuit extending from one side of the 220 volt source over the contactor winding, contacts 565, 561, to the second side of the 220 volt A.C. source. As noted above, front safety switch 565 responds to a matrix detector plunger 208 and also to a magazine frame safety level plunger 209, and in the event either is operated switch 565 would be open to prevent operation of the motor 185, at this time. Assuming, however, that the safety switch 565 is closed, motor rotates in a direction controlled by operated lower magazine valve 500 to cause the upper magazines 1 and 2 to be moved out of the operating position and the lower magazines 3 and 4 to be shifted into the operating position.

As the lower magazines 3 and 4 are moved to the operating position, an associated cam switch (not shown, but described in the publications set forth above) automatically interrupts the power to the magazine shift motor.

At the time initial movement of the magazines in the upward direction is effected by the motor 185, the upper limit switch ULS (FIGS. 1 and 21) is opened, and the energizing circuit for upper limit relay 530 is interrupted. As relay 530 restores, contacts 532, 534, 536 are opened, and contacts 531, 533, 535 are closed to indicate to the system that the upper magazines 3 and 4 are no longer in the operating position. However, such change is without effect since there are no marking signals on conductors 476 and 477 at this time. Similarly, the opening of contacts 537 by upper limit relay is without effect since the marking circuit is presently interrupted by open channel relay 550 at its contacts 557.

As the magazines are shifted by the motor to move the lower magazine pair into the operating position, magazines 3 and 4 will close mechanical switch LLS (FIG. 1). At this time an operating circuit will be completed for the lower limit relay 540 (FIG. 22) which extends from ground over relay 540, contacts LLS and conductor 475 to 24 volts A.C.

It will be recalled that magazine function relay MR3 closed contacts 48 to indicate to the control relays CR that matrices were to be selected from the upper magazine of the lower pair (3 and 4). As lower limit relay 540 now operates, it is effective at its contacts 542 to connect the marking potential placed on conductor 495 by magazine relay MR3 to upper channel relay 520; and at its contacts 546 extends the operating potential which was placed on conductor 497 by contacts 489 of relay MR3 to the control valve relay 515; and at its contacts 547 prepares the indicating circuits MI1–MI4 to the magazine marking circuits for the purpose of resetting the operated one of the magazine register circuts M1–M4 and simultaneously energizing the lamp for the effective one of the magazines.

The energizing circuit for the control valve relay 515 extends from 24 volt A.C. potential over contacts 489, conductor 497, contacts 546 (FIG. 22) 552, the winding of control valve relay 515, contacts 554, safety switch contacts 586 and contacts 571 to ground. As the control valve relay 515 operates, it is effective at its contacts 516, 517 to complete the energizing circuit for the master valve 513 and the control valve 514. As the master valve 513 and control valve 514 operate, power is provided to the hydraulic ram 55 which enables the clutch unit to operate through the last 180° of its cycle to move the channel entrance mechanism back to its closed condition. During the initial movement of the clutch mechanism in the last 180° portion of its cycle, the mechanical switch 586 opens to interrupt the energizing circuit for the control valve relay 515 which restores, and in turn at its contacts 516, 517 interrupts the energizing circuit for the master valve 513 and control valve 514, which restore. However, as before, the clutch continues through its cycle until such time as the channel entrance mechanism has been restored to its normal position. As the mechanical switch 586 is opened, it is further effective to interrupt the energizing circuit for the motor control relay 560 which restores, and at its contacts 561 further opens the energizing circuit for the magazine shift motor contactor 185.

As the channel entrance mechanism reaches its normal position, the open channel mechanical switch OCS opens to interrupt the energizing circuit for the open channel relay 550, which restores, and at its contacts 551, 555 prepares the control valve relay 515 for operation as the next major shift is required; and at its contacts 557 connects power to the indicating; circuits MI1–MI4.

As the open channel relay 550 restores, it is also effective at contacts 553 to complete an energizing circuit for the upper channel relay 52 0which extends from 24 volt A.C. potential over contacts 488 (it being recalled that relay MR3 is operated to request selection of matrices from magazine 3), conductor 495, and contacts 542 the winding of relay 520 and contacts 553 to ground. As upper channel relay 520 operates, it is effective at its contacts 521 to complete the energizing circuit for the rotary solenoid 242 which operates to move the keyrod frame in a forward direction, whereby the keyrods 240 will effect selection of matrices from the upper magazine of the lower pair of magazines (3 and 4). As the keyrods 240 are moved to the forward position, the switch 252 is in the position illustrated in FIGURE 9, and as shown in FIGURE 22, contacts 252A will be closed to complete the indicating circuit MI3 to the magazine circuit M3, such circuit extending from ground over contacts 557, 547, 252A and conductor MI3 to the reset circuit for the magazine marking circuit M3 to cause the switching transistors (such as 440 and 456 in circuit M1) in circuit M3 to restore; additionally an energizing circuit is completed for the lamp transistor, such as 470 in circuit M1, to turn on lamp L3.

As the switching transistors in circuit M3 restore, magazine relay MR3 restores, and at its contacts 486 removes the energizing potential from the circuit for the inhibit relay from conductors CINR to permit the operation of the tape advancing mechanism; at its contacts 487 completes the series circuit to the sequence equipment in the mold disc circuitry, indicating that the magazine control has been completed; and at its contacts 488 and 489 interrupts the marking potentials on conductors 495, 497 to the magazine control relays.

The tape reader TTS now operates to resume readout of the signals on the tape equipment, and the matrices will be selected from magazine 3.

*Shift of magazine 3 to magazine 4*

In the event that the operator desires to select matrices from magazine 4, only a minor shift will be required. That is, as in the example given relative to the minor shift between magazines 1 and 2, it is only necessary for the operator to punch the code UR, UR, M4, LR. As such information is advanced for sensing by the tape readout equipment, the matrix M will effect energization of signal conductors M, N4, and N0 and as a result thereof, the magazine relay MR4 (490) will be operated.

As magazine relay MR4 operates, it is effective at its contacts 491 to connect energizing potential to the conductor CINR for the inhibit relay which halts the tape advance, and at its contacts 492 opens a circuit without effect at this time; at its contacts 493 extends 24 volt A.C. marking potential over conductor 496, contacts 544 and the winding of lower channel relay 525, and contacts 553 to ground. It is noted that with the lower magazines in the operating position, the lower limit relay 540 is energized, and contacts 543 are open so that the signal on conductor 496 will not be extended to the start circuit for a major shift—i.e., none is required.

Lower channel relay 525 operates, and at its contacts 524 completes the energizing circuit for the rotary solenoid 241 which operates the keyrods 240 to their rearward position. As keyrods reach the rearward position, the matrices will now be selected from magazine 4 and switch 252 is operated (FIGURE 9) to close contacts 252B (FIG. 23).

As the switch contacts 252B close, a circuit is completed from ground over contacts 557, 547 switch 252B and indicator conductor MI4 to the reset circuit for magazine marking circuit M4 to effect restoration of the magazine relay MR4 in the manner described heretofore. Simultaneously, the signal on conductor MI4 effects energization of the lamp L4 (FIG. 19).

*Major shift of magazines from lower to upper channel*

The manner in which the equipment is operative to effect a major shift from the lower magazines 3 or 4 to the upper magazines 1 and 2 will now be briefly described.

Assuming that a set of command information, such as shown in the tape in FIGURE 17, is received, as the tape is advanced, the equipment will be responsive to readout of the letter M to effect operation of the magazine selector circuit MSC in the marking of conductor 420 (FIG. 19). With the readout of the following digit 1, the marking of conductor N1 by matrix M will effect enablement of the magazine marking circuit M1 which latches control relay MR1 in the energized position, and contacts 463, 464 are closed to place markings described above on conductors 474, 476 to the control relays CR (FIG. 20). Additionally function relay MR1 at its contacts 466 provides holding potential for the inhibit relay CINR to prevent advance of the tape during the magazine adjustment, and at its contacts 462 provides a signal to the sequence circuit in the mold disc circuitry indicating that a magazine operation is required.

Function relay MR1 at its contacts 463 is also effective to extend 24 volt A.C. potential over contacts 463, conductor 474, and contacts 535 to the upper magazine relay 505, which operates, and at its contacts 506 completes an energizing circuit for master valve 513, and at its contacts 507 completes a circuit for upper magazine valve 503 which adjusts the contactors for the motor to insure the proper direction of rotation of motor as energized to effect the desired shift of the upper magazines into operating position.

As the mold disc adjustment is effected and the contacts 683', 643 are closed, the start circuit for effecting the major shift is completed to the control valve relay 515.

Digressing briefly, it will be recalled that in the present example, the matrices were being selected from magazine 4, and accordingly lower limit relay 540 is in the operated position (FIG. 23) and the keyrod frame 240 is in its rearward position. Accordingly, as contacts 643, 683' close, an energizing circuit is completed for the control valve relay 515 which extends from 24 volts A.C. (FIG. 19) over contacts 464, conductor 476, contacts 531, 590, contacts 683', 643, conductor 591, contacts 551, the winding of relay 515, contacts 555 and 571 to ground.

Control valve relay 515 operates, and at its contacts 517 enables control valve 514, and at its contacts 516 further enables the master valve 513.

As the equipment operates to effect opening of the channel in response to the operation of the valves 513, 514, switch OCS closes to operate open channel relay 550 which at its contacts 552 restores control valve relay 515 and otherwise conditions the circuit, as described earlier herein.

As the open clutch advances through approximately 180° of its cycle, safety switch 586 is operated, and motor control relay 560 is energized to close contacts 561 and thereby effect operation of magazine shift motor contactor 185 in the direction previously determined by the operated condition of upper magazine relay 505 whereby magazines 3 and 4 are moved out of operating position, and magazines 1 and 2 are moved into operating position.

As the magazines are shifted from the lower channel position, mechanical switch LLS opens (FIG. 20) and lower limit relay 540 restores and at its contacts 541, 547 indicates to the equipment that the motor channel magazines are no longer in the operative position. As the shift is completed, contacts (not shown) interrupt the energizing circuit for the magazine shift motor. Further, as the upper magazines are moved into the operating position, upper limit switch ULS closes to complete an obvious energizing circuit for upper limit relay 530 (FIGURE 20).

Upper limit relay 530 operates, and at its contacts 536 completes an operating circuit for control valve relay 515, the circuit extending from 24 volts A.C. potential over contacts 463, conductor 474, contacts 536, 552, the winding of control valve relay 515, contacts 554, mechanical switch contacts 586, contacts 571 to ground. Control valve relay 515 operates, and as before described, energizes master valve 513 and control valve 514 to effect operation of the clutch through the 180°–360° portion of its cycle. As the clutch moves through the initial segment of such portion of its cycle, mechanical switch contacts 586 open to restore motor control relay 560 and control valve relay 515. The relay 515 restores and in turn restores master valve 513 and control valve 514. As noted above, the clutch mechanism continues through its cycle until the 360° point is reached.

As the channel entrance closes, open channel switch OCS opens to restore open channel 530 which at its contacts 553 completes an energizing circuit for upper channel relay 520 which extends from 24 volts A.C. over contacts 464, conductor 476, contacts 532, upper channel relay 520 and contacts 553 to ground. Upper channel relay 520 operates, and at its contacts 521 energizes rotary solenoid 242 which adjusts the carriage frame to the forward position whereby switch 250 is operated to close contacts 250A.

The MI1 indicating circuit is now completed to the magazine marking circuit M1 to restore the marking circuit and effect illumination of lamp L1 in the manner described heretofore. The restoration of the marking circuit M1 effects removal of the energizing potential from conductors 474, 476 and the control relay 520 restores.

While only a particular embodiment of the invention has been disclosed and claimed, it is apparent that modifications and alterations may be made therein, and it is intended that the appended claims cover all such modifications and alterations as may fall within the true spirit and scope of the invention.

What is claimed is:

1. In a linecasting machine, the combination of a plurality of superposed matrix magazines movable into and out of operative position, a channel entrance mechanism movable into and out of operative position, a tape reader adapted to read a coded tape, and control means responsive to the signals from said tape reader including means for moving said channel entrance mechanism out of operative position, and means for presenting the magazine indicated by said signals in the operative position during the period said channel entrance mechanism is out of the operative position.

2. In a linecasting machine, the combination of a plurality of matrix magazines movable into and out of operative position, a channel entrance mechanism for distributing the matrices between the channels of the magazines, distributor screws associated with said channel entrance mechanism, drive mechanism comprising a distributor clutch for driving said distributor screws, tripping means responsive to the clogging of a matrix in the channels of said channel entrance mechanism for automatically releasing said distributor clutch, a tape reader adapted to read a coded tape, automatic mechanism responsive to said tape reader for presenting any selected magazine into operative position, and switch means responsive to the tripping of said distributor clutch for controlling said automatic mechanism.

3. In a linecasting machine, the combination of a plurality of magazines shiftable into and out of operative position, magazine shifting mechanism, a manually operated mechanism for actuating said magazine shifting mechanism, a hydraulically operated mechanism for actuating said magazine shifting mechanism, said hydraulically operated mechanism having a working stroke substantially longer than the working stroke of said manually operated mechanism, and means for connecting said two latter mechanisms for conjoint operation including a lost motion connection therebetween for accommodating the longer stroke of the hydraulic mechanism to the shorter stroke limitation of said manually operated mechanism.

4. In a limecasting machine, the combination of a plurality of superposed matrix magazines shiftable into and out of operative position, magazine shifting mechanism having a predetermined length of stroke, power operated mechanism for actuating said magazine shifting mechanism, said power operating mechanism having a longer working stroke than the working stroke of said magazine shifting mechanism, and means operatively connecting said two mechanisms together comprising a lost motion connection which will accommodate the longer stroke of said power operated mechanism to the shorter stroke limitation of said magazine shifting mechanism.

5. The combination defined in claim 4 wherein said lost motion connection comprises an anchor pin secured to a fixed point of anchorage, a lost motion link having a slot therein engaging over said anchor pin, and a screw threading into said slot and operative to vary the effective length of said slot whereby to vary the amount of lost motion which said link can have relatively to said anchor pin.

6. In a linecasting machine, a plurality of magazines, each of which carries matrices for use in casting a slug, a plurality of keyrod selection means for selecting matrices from a magazine, movable means operable between different positions to control movement of said plurality of keyrod selection means to front and rear positions in the selection of matrices from correspondingly different ones of said magazines, means for providing coded signals requesting selection from one of said magazines, and control means responsive to said coded signals including means operative to automatically shift said movable means and thereby said keyrod selection means to the position required to select matrices from the magazine indicated by said signals, and means for providing indications to said control means of the position of said keyrod selection means.

7. In a linecasting machine, a plurality of magazines, each of which carries matrices for use in casting a slug, and each of which is operable between an effective and an ineffective position, matrix selecting means for selecting matrices only from a magazine in the effective position, means for providing one group of coded signals for matrix selection and another group of coded signals for magazine selection, magazine shift means for selectively shifting said magazines between its effective and ineffective positions, and control means responsive to receipt of said other group of signals to control said magazine shift means to shift the magazine indicated by the other coded signals to the effective position.

8. A linecasting machine as set forth in claim 7 which includes blocking means for preventing response of said matrix selecting means to said other coded signals which indicate the magazine from which the matrices are to be selected.

9. In a linecasting machine, a plurality of magazines, each of which carries matrices for use in casting a slug, and each of which is operable between an effective and an ineffective position, matrix selecting means for selecting matrices only from a magazine in the effective position, magazine shift means for selectively shifting said magazines between the effective and ineffective positions, means for providing coded signals indicating the magazine from which matrices are to be selected, and control means responsive to said coded signals including first means for enabling said magazine shift means to shift a plurality of magazines including the magazine indicated by the signals to the effective position, and second means operative after said shift to automatically enable said matrix selecting means to select matrices from the magazine indicated by the coded signals.

10. A line casting machine as set forth in claim 9 in which said second means includes magazine position switch means for providing a signal in response to movement of the indicated magazine to the effective position, and means responsive to said signal to enable said matrix selecting means to select matrices from the indicated magazine.

11. In a linecasting machine, a plurality of magazines, each of which carries matrices for use in casting a slug, and each of which is operable between an effective and an ineffective position, matrix selecting means for selecting matrices only from a magazine in the effective position, magazine shift means for selectively shifting said magazines between its effective and ineffective positions, means for providing coded signals indicating the magazine from which matrices are to be selected, and control means including a plurality of magazine position switch means, means for operating said switches to different positions with different magazines in the effective position, and major-shift start means controlled by said plurality of switch means to enable said magazine shift means only when a coded signal indicates a magazine in the ineffective position.

12. A linecasting machine as set forth in claim 11 in which said plurality of switch means includes an upper limit relay for a first pair of magazines and a lower limit relay for a second pair of magazines, each of which is in a first switching condition when its associated pair of magazines is in the effective position, and a second switching condition when its associated pair of magazines is in the ineffective position, and each of which includes a plurality of switch contacts, and in which said start means includes a start circuit connected for completion by certain of said contacts on said relays only when the coded signal is for a magazine of the pair associated with the relay in the second switching condition.

13. A linecasting machine as set forth in claim 11 which includes upper and lower channel relays for selectively controlling said matrix selecting means in the selection of matrices from one of the magazines of the plurality in the effective position, and in which said switch means include contacts for completing an enabling circuit for the one of said upper and lower channel relays associated with the magazine from which matrices are to be selected.

14. In a linecasting machine, a plurality of magazines, each of which carries matrices for use in casting a slug, matrix selecting means for selecting matrices from a magazine including a channel entrance mechanism and operating means for opening and closing said channel entrance mechanism, magazine shift means for selectively shifting each of said magazines between an effective and ineffective position, means for providing signals indicating the magazines from which matrices are to be selected, and control means responsive to said signals including a first means for enabling said operating means to open said channel entrance mechanism prior to a shift of said magazines to the effective position, means for thereafter effecting operation of said shift means, and switch means operative to prepare a second enabling circuit for said operating means for completion responsive to shifting of the indicated magazine to the effective position.

15. In a linecasting machine, a plurality of magazines, each of which carries matrices for use in casting a slug, and each of which is operable between an effective and an ineffective position, means for providing coded signals indicating the magazine to be in the effective position, matrix selecting means for selecting matrices indicated by said coded signals only from a magazine in the effective position, magazine shift means for selectively shifting said magazines between the effective and ineffective positions, and control means for enabling said magazine shift means responsive to said coded signals including a shift motor, directional means for selecting the direction of rotation of said motor, electromagnetically controlled valves for hydraulically operating said directional controls, and means for controlling operation of said valves and said motor to effect shifting of the indicated magazine into the effective position.

16. A linecasting machine as set forth in claim 15 which includes a hydraulic system, and a master valve for providing hydraulic power from said system to said controlled valves responsive to coded signals indicating a shift of a magazine from the ineffective to the effective position.

17. In a linecasting machine, a plurality of magazines, each of which carries matrices for use in casting a slug, matrix selecting means for selecting matrices from a magazine, means for providing signals indicating the magazine from which matrices are to be selected, control means responsive to said signals including an individual control circuit for each magazine, selector means for enabling the individual circuit for the magazine indicated by the coded signals, and switching means in the enabled one of said individual circuits for controlling the selection of matrices from the indicated magazine by said matrix selection means.

18. A linecasting machine as set forth in claim 17 in which said signal is a momentary signal, and said individual control circuit includes a latching circuit for marking receipt of said signal, and a release circuit for disabling said latching circuit only after matrix selection is shifted to the indicated magazine.

19. A linecasting machine as set forth in claim 17 in which said magazines are divided into groups and said switching means includes a first means for providing a signal which indicates the group in which its associated magazine is located, and a second means for providing a signal which indicates the relative position of the magazine in the group.

20. In a linecasting machine, a plurality of magazines, each of which carries matrices for use in casting a slug, matrix selecting means for selecting matrices from a magazine, information bearing means for providing coded signals indicating the magazine from which matrices are to be selected, readout means for said information bearing means, control means responsive to said signals from said readout means including an individual control circuit for each magazine, selector means for enabling the individual control circuit for the magazine indicated by the coded signal, switching means in the enabled one of said individual control circuits for controlling the selection of matrices from the indicated magazine, and means for inhibiting said readout means during operation of said switching means.

21. In a linecasting machine, a plurality of groups of magazines, each of which carries matrices for use in casting a slug, magazine shift means for shifting said magazines to an effective position, matrix selecting means for selecting matrices from a magazine in the effective position, means for providing signals indicating the magazine from which matrices are to be selected, and control means responsive to said signals including an individual control circuit for each magazine, switch means in each individual control circuit for providing a first signal in response to a signal for its associated magazine which indicates the group of its magazines, and a second signal which indicates the relative position of the magazine in its group, a plurality of magazine position means, each of which is operative to indicate the position of a different group of said magazines, and start means controlled by said magazine position means to enable said magazine shift means responsive to one of said first signals indicating a magazine not in the effective position.

22. A linecasting machine as set forth in claim 21 in which said magazine shift means shifts a group of magazines into the effective position in each operation and said control means further includes channel means controlled by said second signal to select the indicated one of said magazines from said group.

23. A linecasting machine as set forth in claim 21 which includes switch means operative after operation of said magazine shift means for extending said second signal to said channel means.

24. A linecasting machine as set forth in claim 21 in which said control means includes means operative after shifting of the magazines including the desired magazine to the effective position to complete a feedback circuit to the individual control circuit for the desired magazine, and reset means for said individual control circuit responsive to enablement of said feedback circuit.

25. In a linecasting machine information bearing means for providing coded signals, a plurality of pairs of magazines, each of which magazines carries matrices for use in casting a slug, and each of which is operative to an effective and ineffective position, readout means for said information bearing means, matrix selecting means for selecting matrices from one magazine of the pair in the effective position, and control means selectively controlled by a predetermined one of said coded signal from said readout means to automatically shift the indicated pair of magazines to said effective position.

26. A linecasting machine as set forth in claim 25 in which said control means includes a marking circuit for each magazine, selector means controlled by said readout means to enable the marking circuit for the magazine indicated by said readout means, and means in each marking circuit operative with enablement of its marking circuit to inhibit further operation of said readout means until the indicated magazine is moved into the effective position.

27. In a linecasting machine, information bearing means for providing coded signals, a plurality of magazines, each of which carries matrices for use in casting a slug, magazine shift means for shifting said magazines between an effective and an ineffective position, at least one other functional apparatus on the linecasting machine for providing a predetermined function in the provision of a slug, each functional apparatus having positioning means for adjusting the apparatus to different positions, readout means for said information bearing means, matrix selecting means for selecting matrices from said magazines, means selectively operative in response to predetermined coded signals from said readout means to block further response of said matrix selecting mechanisms to said coded signals, control means thereafter responsive to readout of certain ones of said coded signals to enable said positioning means for the ones of said functional apparatus indicated by the signals, and responsive to other ones of said signals to operate said magazine shift means to shift the indicated magazine into the effective position.

28. In a linecasting machine, a plurality of magazines, each of which carries matrices for use in casting a slug, and each of which is operable between an effective and an ineffective position, matrix selecting means for selecting matrices only from a magazine in the effective position, magazine shift means for selectively shifting said magazines between the effective and ineffective positions, means for providing coded signals indicating the magazine from which matrices are to be selected and control means responsive to said coded signals for enabling said magazine shift means to shift at least one magazine in the effective position to the ineffective position and, in the same operation, the magazine indicated by the coded signals from the ineffective position to the effective position.

29. A linecasting machine as set forth in claim 28 in which said control means is operative to enable said magazine shift means to shift a plurality of magazines concurrently into the effective position in response to said coded signals and which said matrix selecting means includes a plurality of keyrods shiftable into different positions for selectively controlling the discharge of matrices from a different one of the plurality of magazines in the effective position.

30. In a linecasting machine, a plurality of magazines, each of which carries matrices for use in casting a slug, magazine shift means for selectively shifting each of said magazines between effective and ineffective positions, matrix selecting means for selecting matrices only from a magazine in an effective position, means for providing coded signals indicating the magazine from which matrices are to be selected, marking means for marking the one of said magazines identified by the coded signals, and control means for controlling said magazine shift means to shift at least the magazine registered on said marking means to the effective position.

31. In a linecasting machine, the combination of a plurality of matrix magazines shiftable for presenting any selected magazine in operative position, a plurality of keyrods shiftable into different positions for selectively controlling the discharge of matrices from a different one of the magazines, front and rear switches for providing position signals indicating the position of said keyrods, tape means having coded signals, tape reader means adapted to read said tape means, and control means responsive to the coded signals provided by said tape reader and the position signals from said switches to shift said keyrods to the position indicated by the coded signals.

32. In a linecasting machine, a plurality of magazines, each of which carries matrices for use in casting a slug, magazine shift means for selectively shifting each of said magazines between effective and ineffective positions, matrix selecting means for effecting the selection of matrices from said magazines, information bearing means for providing coded signals indicating the magazine from which matrices are to be selected, reader means for said information bearing means, marking means for marking the one of said magazines identified by the coded signals provided by said reader means, control means enabled by said marking means including means for enabling said magazine shift means to shift a plurality of magazines including the magazine registered on said marking means to the effective position, said matrix selecting means including keyrod means shiftable to different positions to selectively control selection of matrices from the indicated one of said plurality of magazines in the effective position, and means in said control means for controlling shifting of said keyrod means to the position necessary to effect the selection of matrices from the one of the magazines indicated by the coded signals.

References Cited by the Examiner

UNITED STATES PATENTS

| | | |
|---|---|---|
| 1,347,745 | 7/1920 | Kennedy. |
| 1,960,182 | 5/1934 | Freund et al. _____ 199—19 |
| 2,797,797 | 7/1957 | Gutzmer _____ 199—21 |

ROBERT E. PULFREY, *Primary Examiner.*

W. F. McCARTHY, *Assistant Examiner.*